United States Patent
La Porta et al.

(12) 
(10) Patent No.: US 6,434,134 B1
(45) Date of Patent: Aug. 13, 2002

(54) DYNAMIC ADDRESS ASSIGNMENT FOR WIRELESS DEVICES ACCESSING PACKET-BASED WIRED NETWORKS

(75) Inventors: Thomas F. La Porta, Thornwood, NY (US); Ramachandran Ramjee, Matawan, NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/210,341

(22) Filed: Dec. 11, 1998

(51) Int. Cl.[7] .................................................. H04J 3/24
(52) U.S. Cl. ........................ 370/338; 370/475; 709/245
(58) Field of Search ................................. 370/230, 313, 370/328, 329, 331, 338, 401, 474, 475; 340/825.52; 455/435, 436; 709/242, 245

(56) References Cited

U.S. PATENT DOCUMENTS

| | | | |
|---|---|---|---|
| 5,159,592 A | 10/1992 | Perkins ...................... | 370/85.7 |
| 5,325,362 A | 6/1994 | Aziz .......................... | 370/94.3 |
| 5,519,706 A | 5/1996 | Bantz et al. ................ | 370/85.3 |
| 5,564,070 A | 10/1996 | Want et al. ................. | 455/53.1 |
| 5,598,536 A | 1/1997 | Slaughter, III et al. . | 395/200.16 |
| 5,708,655 A | 1/1998 | Toth ........................... | 370/313 |
| 5,717,688 A | 2/1998 | Belanger et al. ............ | 370/331 |
| 5,745,699 A * | 4/1998 | Lynn et al. ............. | 395/200.75 |
| 5,790,548 A | 8/1998 | Sistanizadeh et al. ....... | 370/401 |
| 5,812,531 A | 9/1998 | Cheung et al. ............. | 370/255 |
| 5,812,819 A | 9/1998 | Rodwin et al. ............. | 395/500 |
| 5,835,725 A * | 11/1998 | Chiang et al. ......... | 395/200.58 |
| 6,147,986 A * | 11/2000 | Orsic ......................... | 370/349 |
| 6,246,670 B1 * | 6/2001 | Karlsson et al. ............ | 370/244 |

FOREIGN PATENT DOCUMENTS

| | | | |
|---|---|---|---|
| EP | 0 483 547 A1 | 6/1992 | ........... H04L/12/56 |

OTHER PUBLICATIONS

Perkins, C.E., et al.: "DHCP For Mobile Networking With TCP/IP" Proceedings IEEE Symposium on Computers and Communications (Cat. No. 95[TH]8054), Alexandria, Egypt, Jun. 27–29, 1995, pp. 255–261, XP002132695, 1995, Los Alamitos, CA, USA, IEEE Comput. Soc. Press, USA ISBN: 0–8186–7075–4, p. 258.

Perkins, C.E., et al., "Using DHCP With Computers That Move" Wireless Networks, US, ACM, vol. 1, No. 3, Oct. 1, 1995, pp. 341–353, XP000538245, ISSN: 1022–0038.

C.E. Perkins and D.B. Johnson; Internet Engineering Task Force proposal entitled "Route Optimization In Mobile IP"; Internet Draft—Work In Progress; Nov. 1997; 22 pgs.

C. Perkins—Editor; Internet Engineering Task Force (IETF) proposal entitled "IP Mobility Support"; Request for Comments 2002; Oct. 1996; 79 pages.

* cited by examiner

*Primary Examiner*—Ricky Ngo
(74) *Attorney, Agent, or Firm*—Matthew J. Hodulik; Guy Eriksen

(57) ABSTRACT

The number of packet routing addresses utilized within a wired subnet offering wireless services via subnet base stations is reduced by assigning a packet routing address to a wireless device accessing a wired subnet upon power up of the wireless device. A Dynamic Host Configuration Protocol (DHCP) server is utilized to assign the packet routing addresses, and supplies addresses either directly or indirectly via a node acting as a DHCP relay for a DHCP server. If the assigned packet routing address is a care-of address for a foreign domain, the address is released upon wireless device power down or upon handoff of the wireless device to a new domain. If the assigned packet routing address is an address for the wireless device within a home domain, the address is released upon wireless device power down.

12 Claims, 20 Drawing Sheets

FIG. 7

| PARAMETER | REFRESH PATH SETUP MESSAGE |
|---|---|
| MESSAGE TYPE | REFRESH |
| SEQUENCE NUMBER | MIN(1, SEQUENCE NUMBER OF THE ENTRY IN BASE-STATION) |
| MOBILE IP ADDRESS | IP ADDRESS OF MOBILE DEVICE ATTACHED TO BASE-STATION |
| SOURCE IP ADDRESS | IP ADDRESS OF BASE-STATION SENDING THE REFRESH MESSAGE |
| DESTINATION IP ADDRESS | IP ADDRESS OF DOMAIN ROOT ROUTER |
| METRIC | SET AS ONE BY BASE-STATION, INCREMENTED BY OTHERS |

FIG. 8

| PARAMETER | POWER UP UPDATE PATH SETUP MESSAGE |
|---|---|
| MESSAGE TYPE | UPDATE |
| SEQUENCE NUMBER | ZERO |
| MOBILE IP ADDRESS | IP ADDRESS OF MOBILE DEVICE |
| SOURCE IP ADDRESS | IP ADDRESS OF CURRENT BASE-STATION |
| DESTINATION IP ADDRESS | IP ADDRESS OF DOMAIN ROOT ROUTER |
| METRIC | SET TO ZERO BY MOBILE DEVICE, INCREMENTED BY OTHERS |

*FIG. 9*

| PARAMETER | HANDOFF UPDATE PATH SETUP MESSAGE |
|---|---|
| MESSAGE TYPE | UPDATE |
| SEQUENCE NUMBER | MIN((SEQUENCE NUMBER OF PREVIOUS UPDATE + 1)%MAX SEQ NUM,2) |
| MOBILE IP ADDRESS | IP ADDRESS OF MOBILE DEVICE |
| SOURCE IP ADDRESS | IP ADDRESS OF NEW BASE-STATION |
| DESTINATION IP ADDRESS | IP ADDRESS OF OLD BASE-STATION |
| METRIC | SET TO ZERO BY MOBILE DEVICE, INCREMENTED BY OTHERS |

300

310 — MESSAGE TYPE
312 — SEQUENCE NUMBER
314 — MOBILE IP ADDRESS
316 — SOURCE IP ADDRESS
318 — DESTINATION IP ADDRESS
320 — METRIC

1) CH.40102 > MH.commplex-link: S 1626551371:1626551371(0) win 8760 <mss 1460> (DF) (ttl 255,id 47691)
2) HA > FA: CH.40102 > MH.commplex-link: S 1626551371:1626551371(0) win 8760 <mss 1460> (DF) (ttl 254,id 47691) (DF) (ttl 254,id 51069)
3) MH.commplex-link > CH.40102: S 3552498482:3552498482(0)ack 1626551372 win 17520 <mss 1460> (DF) (TTL 63, id 6624)
4) CH.40102 > MH.commplex-link: . ack 3552498483 win 8760(DF) (ttl 255, id 47692)
5) HA > FA: CH.40102 > MH.commplex-link: . ack 3552498483 win 8760 (DF) (ttl 254, id 47692) (DF) (ttl 254, id 51070)
6) CH.40102 > MH.commplex-link: P 1:1461(1460) ack 1 win 8760 (DF) (ttl 255, id 47693)
7) HA > CH:icmp: MH unreachable - need to frag (mtu 1480) (DF) (ttl 255, id 51072)
8) CH.40102 > MH.commplex-link: . 1:1441(1440) ack1 win 10080 (DF) (ttl 255, id 47694)
9) HA > FA: CH.40102 > MH.commplex-link: . 1:1441(1440) ack 1 win 10080 (DF) (ttl 254, id 47694) (DF) (ttl 254, id 51078)
10) MH.commplex-link > CH.40102: . ack 1441 win 17520 (DF) (ttl 63, id 6627)

1) CH.50704 > MH.rfe: S 2197768393:2197768393(0) win 8760 <mss 1460> (DF)
2) CH.50704 > FA.rfe: S 2197768393:2197768393(0) win 8760 <mss 1460> (DF)
3) MH.rfe > CH.50704: S 4212372961:4212372961(0) ack 2197768394 win 17520 <mss 1460> (DF)
4) CH.50704 > MH.rfe: . ack 1 win 8760 (DF)
5) CH.50704 > FA.rfe: . ack 4212372962 win 8760 (DF)
6) CH.50704 > MH.rfe: P 1:1461(1460) ack 1 win 8760 (DF)
7) CH.50704 > FA.rfe: P 0:1460(1460) ack 1 win 8760 (DF)
8) MH.rfe > CH.50704: . ack 1461 win 17520 (DF)

DYNAMIC ADDRESS ASSIGNMENT FOR WIRELESS DEVICES ACCESSING PACKET-BASED WIRED NETWORKS

CROSS REFERENCES TO RELATED APPLICATIONS

This application is related to other U.S. Patent Applications, each having a filing date of Dec. 11, 1998 and each having a common assignee. The related applications are: "Packet Tunneling Optimization to Wireless Devices Accessing Packet-Based Networks," Ser. No. 09/210,487; "Wireless Access to Packet-Based Networks," Ser. No. 09/210,072; "Single Phase Local Mobility Scheme for Wireless Access to Packet-Based Networks," Ser. No. 09/210,213; and "Two Phase Local Mobility Scheme for Wireless Access to Packet-Based Networks," Ser. No. 09/209,705.

FIELD OF THE INVENTION

The present invention relates to the Internet and other packet-based networks and more particularly to methods for wireless access to packet-based networks by mobile devices.

BACKGROUND OF THE INVENTION

Support for wireless access between a correspondent node and a mobile device over the Internet is outlined in an Internet Engineering Task Force (IETF) proposal entitled "IP Mobility Support," C. E. Perkins—Editor, Request for Comments 2002 (October, 1996; hereinafter "Mobile IP"). By utilizing Mobile IP, each mobile device is identified by a fixed home address and associated home agent, regardless of its current point of attachment to the Internet. Packets sent to a mobile device, from a correspondent node, are directed to the home agent. If the mobile device is away from home, the home agent forwards packets within an IP-in-IP tunnel to an assigned care-of address registered with the mobile device. Therefore, delivery of packets using Mobile IP for a mobile device away from home is accomplished utilizing a two-legged routing scheme. This two-legged routing scheme is known as triangular packet routing. Triangular packet routing is performed even if the mobile device away from home is serviced by the same subnet as the correspondent node with which it is communicating, thus resulting in an inefficient routing path for packet delivery.

Any IP addressing scheme has available a limited number of unique addresses. The assignment and use of multiple addresses per mobile device merely exacerbates the quandary associated with having a limited number of addresses.

SUMMARY OF THE INVENTION

The number of active packet routing address assignments is reduced and triangular packet routing is minimized by assigning a packet routing address to a mobile device accessing a wired subnet upon power up of the mobile device, and releasing the assigned packet routing address when the mobile device powers down. An address assigned in the manner described, and in accordance with the present invention, is called a dynamic permanent address. Dynamic permanent addresses are assigned directly by a Dynamic Host Configuration Protocol (DHCP) server or indirectly via a node acting as a DHCP relay for a DHCP server.

In an exemplary embodiment of the present invention, a domain is defined to incorporate an entire subnet which includes interconnected packet routers and wireless base stations for accessing the Internet from a mobile device. Therefore, a mobile device may access the Internet through a base station included within a home domain or a foreign domain. If attached to a base station included within the home domain, the mobile device utilizes only a single address, a dynamic permanent home address. If attached to a base station included within a foreign domain, the mobile device utilizes the dynamic home address and an additional care-of address. The mobile device's home agent tunnels packets to the care-of address when the mobile device is away from home.

Utilizing a Dynamic Home Optimization, in accordance with an exemplary embodiment of the present invention, a mobile device is not registered with any domain as a home domain until the mobile device initiates a power up. Upon initial power up, the mobile device is assigned a dynamic permanent home address from the Dynamic Host Configuration Protocol (DHCP) server within the domain in which the power up occurs. This domain then becomes the home domain for the mobile device. If the mobile device subsequently changes its point of attachment to a base station included in a foreign domain, the mobile device is assigned a second IP address by the DHCP server servicing the foreign domain. This new second address is the mobile device's care-of address. The mobile device retains its original IP address assigned in its home network, and packets are tunneled from the home agent in its home domain to the mobile device's care-of address in the foreign domain. When the device is powered down, the mobile device relinquishes its dynamic permanent home address and the care-of address, allowing those addresses to be available for subsequent reuse. Upon the next power up, the mobile device is assigned a new dynamic permanent address in the domain it attaches to when it powers up.

Advantageously, the present invention's use of dynamic permanent addresses allows for a given number of mobile users to access a subnet utilizing fewer IP addresses than required with a permanent registration type scheme, assuming that all mobile users are not powered up at the same time. Additionally, we have recognized that the mobility of a mobile user between base stations is typically a localized phenomenon. That is, the majority of handoffs occur between base stations which are each included within a common subnet or domain. Therefore, the majority of handoffs between base stations do not require a DHCP server to assign a new care-of address. The present invention leverages this knowledge by designating the domain which includes the base station to which the mobile device attaches upon power up as the home domain. Such a scheme offers two beneficial effects. First, the quantity of IP addresses utilized is further reduced, since only one IP address is required when the mobile device is attached to any base station included within the home domain, the home domain is the domain in which the mobile device powers up, and the majority of handoffs occur within a single domain. Second, instances compelling the use of triangular routing are less frequent since tunneling from a home agent is required only when the mobile device is attached via a foreign domain and the present invention enhances the probability that a mobile device will be serviced by base stations included within the home domain.

BRIEF DESCRIPTION OF THE DRAWINGS

A more complete understanding of the present invention may be obtained from consideration of the following description in conjunction with the drawings in which:

FIG. 7 is a diagram of an exemplary structure for Information Element fields associated with a refresh path setup message, in accordance with the present invention;

FIG. 8 is a diagram of an exemplary structure for Information Element fields associated with a power up path setup message, in accordance with the present invention;

FIG. 9 is a diagram of an exemplary structure for Information Element fields associated with a handoff path setup message, in accordance with the present invention;

FIG. 21 is a chart of a tcpdump trace for a conventional Mobile IP tunneling of packets;

FIG. 22 is a chart of a tcpdump trace for packet delivery from a home agent to a foreign agent utilizing a tunneling optimization scheme, in accordance with the present invention;

DETAILED DESCRIPTION

Although the present invention is illustrated and described herein as an embodiment utilized for wireless access to Internet Protocol (IP)-based networks, such as the Internet or intranets, the embodiment is merely illustrative and should not be construed as being so limited. The present invention is equally applicable for wireless access to any packet-based network from a mobile device.

Figure 1:
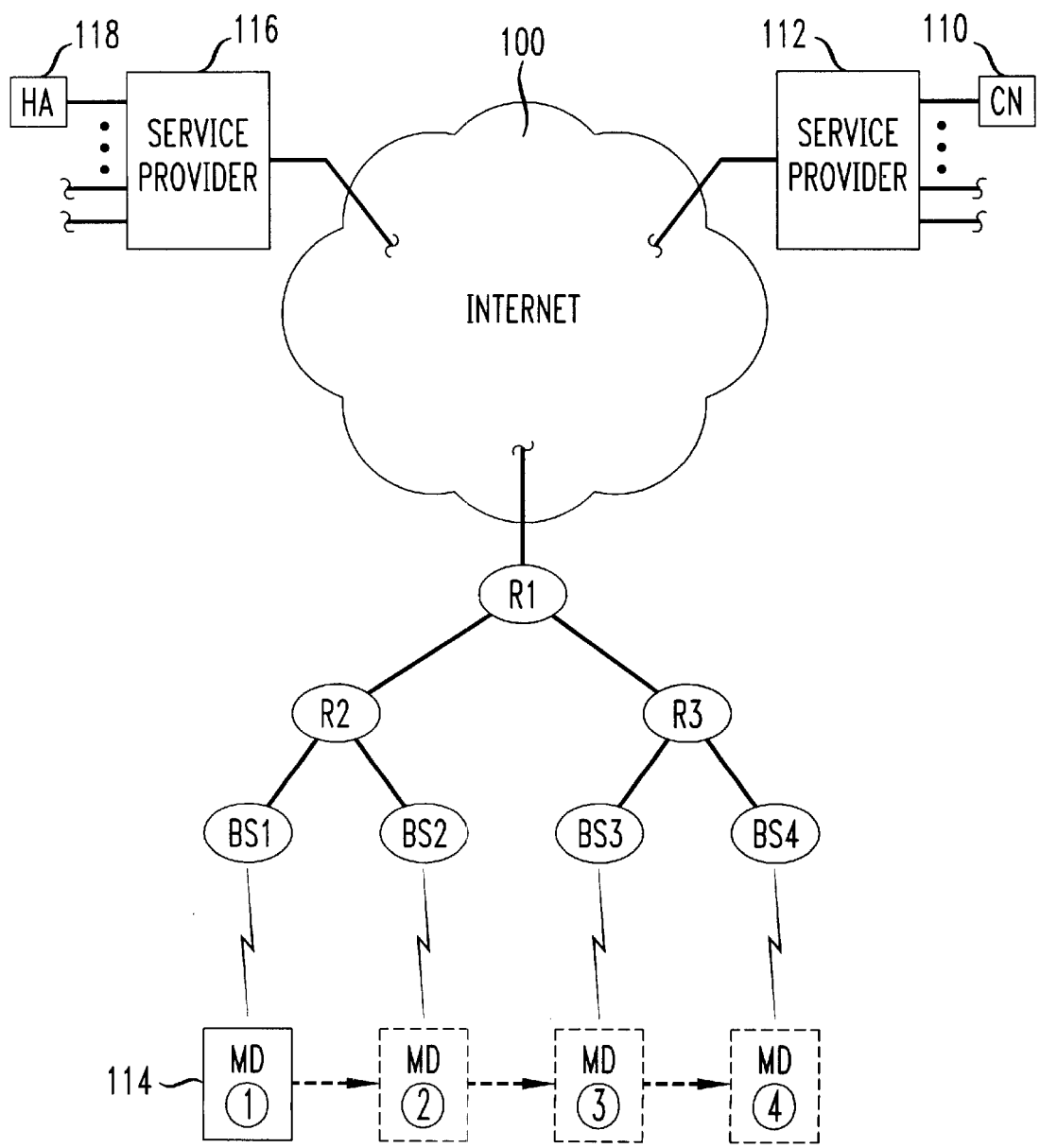
FIG. 1 illustrates an architecture used to provide Mobile IP wireless access to Internet Protocol (IP)-based networks from mobile devices.

Referring to FIG. 1, there is shown an exemplary architecture currently used to provide Mobile IP wireless access to Internet Protocol (IP)-based networks from mobile devices. A correspondent node 110 is illustrated accessing the Internet 100 via a service provider 112. A correspondent node may be either mobile or stationary. A mobile user utilizing a mobile device 114 is illustrated in proximity with base station BS1 and maintaining an established connection with base station BS1. A mobile device is a wireless host or router that is capable of changing its point of attachment from one network or subnet to another. Associated with the mobile device 114 is a home agent 118, the home agent 118 illustrated accessing the Internet 100 via a service provider 116. A home agent is implemented in a node or router and tunnels packets for delivery to the mobile device when it is away from home, and maintains current location information for the mobile device.

Also illustrated are routers attached to the Internet 100 used to route packets between the Internet and a plurality of base stations. Specifically, router R1 is shown interfacing routers R2 and R3. Router R2 is shown interfacing base stations BS1 and BS2. Similarly, router R3 is shown interfacing base stations BS3 and BS4. Within the context of Mobile IP, and throughout the remainder of the description of the present invention, base stations include all of the capabilities associated with conventional wireless base stations, and in addition, include the capabilities associated with conventional routers. This dual-functionality is accomplished with either an integrated router and base station solution, or in the alternative, with separate router and base station components interfaced appropriately to exchange packets between the two. With regard to the latter, the router and base station components are typically co-located within a common facility, although co-location is not a requirement.

The IP mobility support provided by Mobile IP is characterized in that each mobile device is always identified by its home address, regardless of its current point of attachment to the Internet. While situated away from its home, a mobile device is also associated with a care-of address, which provides information regarding its current point of attachment to the Internet. Mobile IP requires registration of the care-of address with the home agent. The home agent tunnels packets destined for the mobile device within IP-in-IP encapsulated packets to the care-of address. When an IP-in-IP packet arrives at the care-of address, the appended IP address is removed and the original packet data is then delivered to the appropriate mobile device. The care-of address is the termination point of a tunnel toward a mobile device for packets forwarded to the mobile device while it is away from home.

As an example of the operation of the Mobile IP scheme, assume that mobile device 114 changes its point of attachment (via handoffs) to the Internet from base station BS1 through base station BS4 as the mobile device moves sequentially and incrementally from mobile device 114 position 1 through 4, as illustrated in FIG. 1. While positioned in proximity to base station BS1, packets sent from the correspondent node 110 to the mobile device 114 are first sent to the mobile device's home agent 118. The home agent 118 tunnels each packet to the corresponding address for base station BS1. When the mobile device is handed off to base station BS2, its point of attachment to the Internet is changed to the address corresponding to base station BS2. The home agent now tunnels packets destined for the mobile device 114 to base station BS2. In order to implement this routing change, notification must be sent to the home agent 118 that the point of attachment has been changed. When the home agent receives this notification, it updates an established routing table so that subsequent packets destined for the mobile device 114 are tunneled to base station BS2. Handoffs to base stations BS3 and BS4 are treated similarly. Such a delivery scheme is known as triangular routing. Mobile IP and the triangular routing scheme utilizing a home agent is effective as a means for providing macro-mobility, that is, as a mobile device changes its point of attachment to the Internet from one IP subnet to another. However, Mobile IP is a less effective means for providing micro-mobility, that is, as handoffs occur amongst wireless transceivers within a common subnet, each of which covers only a very small geographic area.

Recently an extension to the Mobile IP protocol emerged in a draft Internet Engineering Task Force proposal entitled "Route Optimization in Mobile IP," C. E. Perkins—Editor, *Internet Draft—Work in Progress* (November, 1997). The route optimization extension proposes a means in which packets may be routed from a correspondent node to a mobile device without first being forwarded to a home agent. The route optimization extension provides a means for the correspondent node 110 to cache a binding associated with the mobile device 114 and then send packets directly to the care-of address indicated in that binding, thereby bypassing the mobile device's home agent 118. Utilizing the proposal, packets are forwarded from an old base station foreign agent to a new base station foreign agent to reduce disruption during handoff. However, the mobile device's care-of address is nonetheless changed each time the mobile device is handed off between base stations. For example, assume that the mobile device 114 is handed off from base station BS1 (old base station) to base station BS2 (new base station). Because the route optimization extension binds the care-of address to the current foreign agent (associated with the servicing base station), the care-of address is changed from BS1 to BS2. Such a scheme is an improvement in micro-mobility, but still requires undesirable notifications to the home agent 118 and correspondent node 110 for each handoff of the mobile device 114.

When the mobile device is in its home network (i.e.—the same network in which the mobile device's home agent is located), packets destined for the mobile device are intercepted by the home agent. The home agent routes the packets as normal IP packets and sent to the Local Area Network to which the mobile device is normally attached. Therefore, Mobile IP does not support any mobility within the local subnet, whether or not the route optimization extension is utilized. If a mobile device changes its point of attachment within a local subnet, the change must be managed by either link layer modification techniques, or by broadcasting packets destined to the mobile device to all base stations attached to the local subnet. Managing the link layer may result in unacceptable delays and packet loss while broadcasting packets to all base stations is an inefficient use of bandwidth.

Local Mobility Domains

We have recognized that today's wide-area IP network is typically divided into subnets which are managed by independent entities, each entity operating within its respective subnet using independent local protocols, while agreeing upon a standard protocol for interfacing outside of each respective subnet. The present invention takes advantage of the natural independence and autonomy associated with an entity controlled subnet (for example, a cellular service provider having a root router accessing the Internet and servicing a plurality of base stations) by classifying and defining a plurality of domains. Each domain, in effect, is a local subnet. Each domain maintains a root router to access the Internet, and all routers within a domain utilize a common local protocol.

The present invention, in classifying routers having a common root router within defined domains, leverages the fact that the mobility of a mobile user between base stations is typically a localized phenomenon (i.e.—that most handoffs occur between neighboring base stations having an adjacent proximity and which are owned and operated by a common service provider attached through a common root router to the Internet).

Utilizing the present invention, when a mobile device in transit is handed off from one base station within the assigned home domain to another base station within the assigned home domain, selected routers within the home domain have their associated routing tables updated, using specialized path setup messages on a purely local level (i.e.—routers within the home domain only), to reflect the change. Thus, messaging and signaling between routers are minimized since updates occur only on a local domain-based level and only for selected routers (i.e.—only those routers for which routing table updates are required to be made). Also, when using Mobile IP either packets must be broadcast to all the base stations included in a home domain, or link layer addressing must be used to address a single base station; whereas the present invention updates the home domain router's individual routing tables to direct a packet to a single base station. Since IP layer routing may be used end-to-end, IP-layer QoS mechanisms may be utilized in conjunction with the present invention.

However, when a mobile device in transit is handed off from one base station within the assigned home domain to a base station in a foreign domain, packets are tunneled from the home agent to a care-of address assigned to the mobile device within the foreign domain. Micro-mobility within the foreign domain is accomplished by keeping the same care-of address for the mobile device for the entire time the mobile device is attached to the Internet through base stations associated with that foreign domain, regardless of the number of handoffs performed between base stations associated with that domain. Instead, as was described in conjunction with handoffs performed within the home domain, selected routers within the foreign domain have their associated routing tables updated, using specialized path setup messages on a purely local level (i.e.—routers within that foreign domain only), to reflect the change. Thus, messaging and signaling between the foreign agent and the home agent are minimized since updates occur only on a local domain-based level and only for selected routers (i.e.—only those routers for which routing table updates are required to be made). Therefore, handoffs between base stations in a foreign domain are substantially transparent to the mobile user's home agent and correspondent node.

Figure 2:
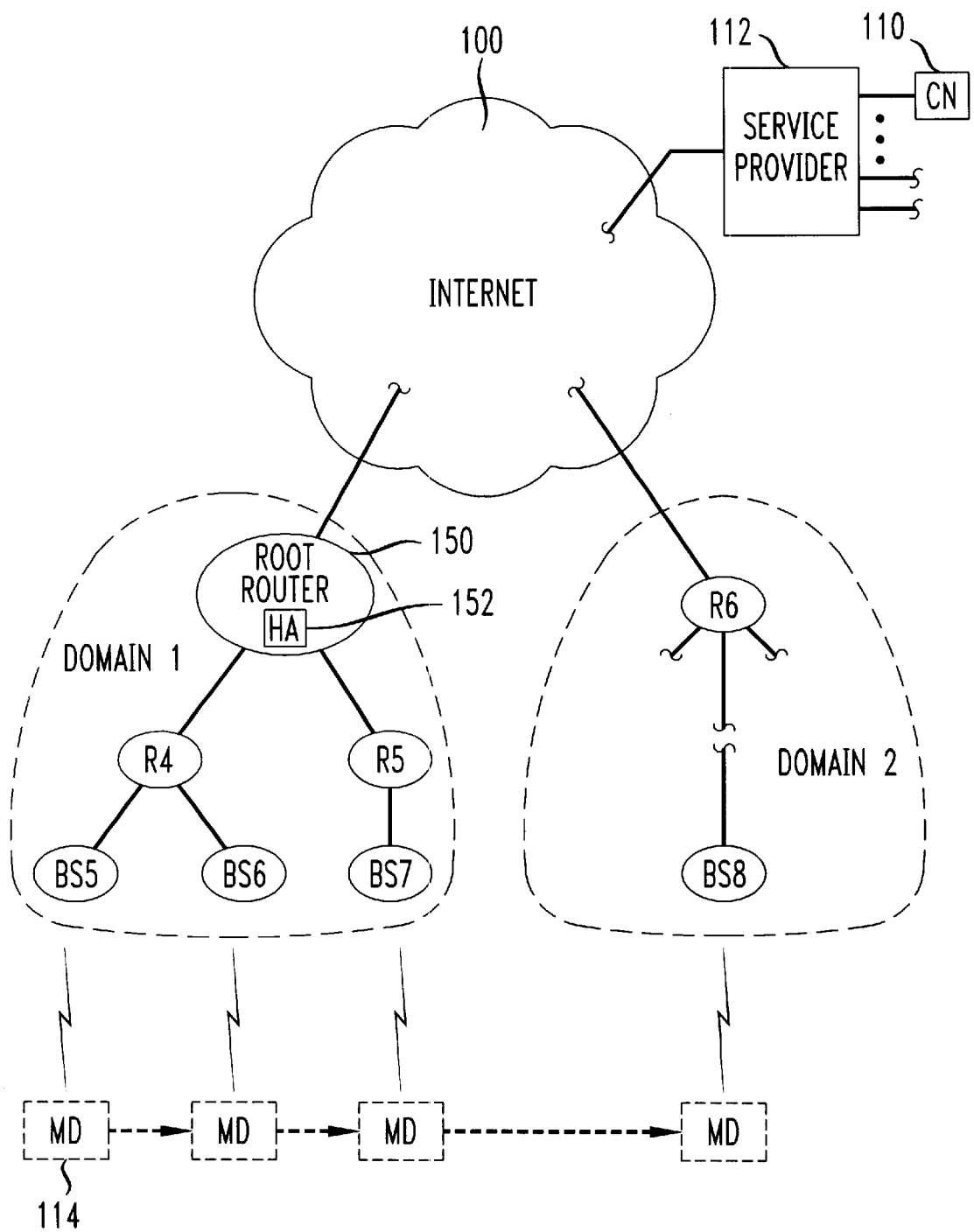
FIG. 2 illustrates the domain-based architecture for a Handoff-Aware Wireless Access Internet Infrastructure (HAWAII), in accordance with the present invention.

FIG. 2 illustrates the domain-based architecture for a Handoff-Aware Wireless Access Internet Infrastructure (HAWAII), in accordance with the present invention. In order to implement HAWAII, the wired access portion of the wireless network is divided into domains, each domain having a common root router through which all packets destined for mobile users connected to a base station within that domain are forwarded. Specifically, shown in FIG. 2 is a wired access portion of a wireless network divided into two domains, Domain1 and Domain2. Domain1 is comprised of a root router through which all packets destined for mobile devices connected to base stations BS5, BS6, or BS7 are routed. Illustratively, routers R4 and R5 are shown as downstream routers utilized within Domain1 to forward packets to the appropriate base station. It is assumed, in this exemplary embodiment, that Domain1 is defined to encompass a subnet representing the home domain servicing a mobile device 114. A home agent 152 is incorporated at root router 150. Although the instant embodiment is illustrated and described as having the home agent 152 implemented within the root router 150 utilizing the capabilities of the processor and memory residing in root router 150, it would be apparent to those skilled in the art to alternatively implement the home agent 152 using a separate co-located processor and memory, such as that available in a personal computer. Furthermore, the home agent need not be implemented in conjunction with the root router at all; that is, the home agent may be implemented in any local router or node capable of communicating with the other routers (including base stations) within the home domain. Domain2 is presented as an exemplary subnet representing a second domain servicing base stations not incorporated within Domain1. Domain2 is therefore representative of a foreign domain. Incorporated within Domain2 are a plurality of routers servicing one or more base stations. For illustrative purposes only, router R6 is shown as a root router for Domain2 and BS8 is shown as one of the base stations serviced through the routers of Domain2. It should also be noted that router R6 may be enabled with home agent and root router functionality for those mobile devices having Domain2 as their assigned home domain, thus Domain2 would be a foreign domain to those mobile devices having home agent functionality residing within root router 150, whereas Domain2 would concurrently be a home domain to those mobile devices having home agent functionality residing within router R6 (not shown). Each subsequent domain (no others illustrated in FIG. 2) provides Internet access for one or more base stations attached to the Internet 100 through a common root router.

As a mobile user operating a mobile device 114 moves about within a domain, whether within the home domain or a foreign domain, the mobile device's IP address remains unchanged. For instance, assuming that a mobile device 114 is first serviced by base station BS5 and is then handed off to base station BS6 and then to BS7, the mobile device's IP address remains the same. The home agent for the mobile user and the correspondent node are shielded from the user's mobility while the device is connected through any base station within that domain. Establishing packet delivery to the mobile device from a new base station within a domain is accomplished by using a specialized path setup scheme, subsequently described, which updates selected host based routing tables in selected routers within the domain. Advantageously, since each domain is identified as a local subnet, there are no changes or updates required to the routing entries in the backbone routers outside of each domain. This method is distinctly different from the method used for the Route Optimization extension to Mobile IP, previously described, in which the mobile device's care-of address is changed each time the mobile device is handed off between neighboring base stations, but routing entries contained within individual routers remain unchanged.

When a mobile device 114 changes its point of attachment from a base station associated with a first domain (with the first domain being either the home domain or a foreign domain) to a base station associated a second domain (with the second domain being any foreign domain, but not the home domain, since tunneling is not required when a mobile device's point of attachment is from any base station included within the home domain), packets are forwarded to the mobile device in the new (second) domain, from the home agent, using a protocol for packet tunneling, one such protocol being Mobile IP. For example, if mobile device 114 is handed off from base station BS7 (wired to the Internet through Domain1) to base station BS8 (wired to the Internet through Domain2), then the home agent 152 at the root router 150 in the home domain (Domain1) begins encapsulating packets and tunnels them to the new care-of address obtained by the mobile device when handed off to a Domain2 base station. Thus, applications can continue to use the same IP address without disruption.

In order to provide a guaranteed Quality of Service (QoS) for delivery of packet flows to mobile users, each router along the packet flow path specifies a predetermined level of QoS associated with each packet, so that adequate router resources are reserved. One method for performing this classification function is through the use of packet header fields specifying a level of QoS associated with each packet. Such a scheme is presented in a paper by T.V. Lakshman and D. Stiliadis entitled "High Speed Policy-based Packet Forwarding Using Efficient Multi-dimensional Range Matching," in the Proceedings of ACM SIGCOMM, 1998 and in a paper by V. Srinivasan, G. Varghese, S. Suri, and M. Waldvogel entitled "Fast Scalable Algorithms for Level Four Switching," in the Proceedings of ACM SIGCOMM, 1998.

However, using the local mobility domains implemented in HAWAII, and in accordance with the present invention, packets transmitted from a correspondent node to a mobile device are uniquely identified by the packet's destination address, which is the mobile device's home address (if the mobile device is attached to the network through a base station within its home domain) or the mobile device's co-located care-of address (if the mobile device is attached to the network through a base station which is incorporated in a foreign domain). Thus, providing QoS guarantees for packets on a per-flow basis within a local mobility domain is greatly simplified when compared to providing that service utilizing the Mobile IP scheme (in which packets are tunneled to a care-of address corresponding to a servicing base station rather than the mobile device itself).

Mobile device users in the HAWAII local mobility domain scheme are assigned a dynamic IP address through a Dynamic Host Configuration Protocol (DHCP) server. As the device is handed off between base stations within the domain, the device's assigned IP address does not change. Therefore, users outside the domain do not perceive the user's mobility. This approach makes use of two IP addresses assigned to each mobile device; one assigned to the mobile device in the home domain and a second assigned when the mobile device is connected through a base station associated with a foreign domain.

Although the use of multiple IP addresses exacerbates the current limited availability of IP addresses, the limited IP address problem will become moot once the use of IP version 6 becomes ubiquitous.

Alternatively, however, an optimization that would conserve available IP addresses is called Dynamic Home Optimization. Using Dynamic Home Optimization, a mobile device does not have any address assigned to it until it is powered up. We have recognized that mobile devices as data clients typically initiate a transaction with a server, such as a web server or mail server, and therefore do not require a permanent IP address. Upon initial power up, the mobile device is assigned a "dynamic permanent address" from the Dynamic Host Configuration Protocol (DHCP) server within the domain in which the power up occurs. This domain then becomes the home domain for the mobile device.

Therefore, the mobile device neither has a permanent address nor is the mobile device registered permanently within any one domain. If the mobile device changes its point of attachment to a base station in a domain other than the one in which it is powered up, the mobile device is assigned a second IP address by the DHCP server residing in the new domain. This new second address is the mobile device's co-located care-of address. When the device is powered down, the mobile device relinquishes its dynamic permanent address (assigned from the DHCP server in the domain in which it powered up) and the co-located care-of address (assigned from the DHCP of the domain to which it is attached at the time of power down). Upon the next power up, the mobile device is assigned a new dynamic permanent address in the domain it attaches to when it powers up.

Figure 3:
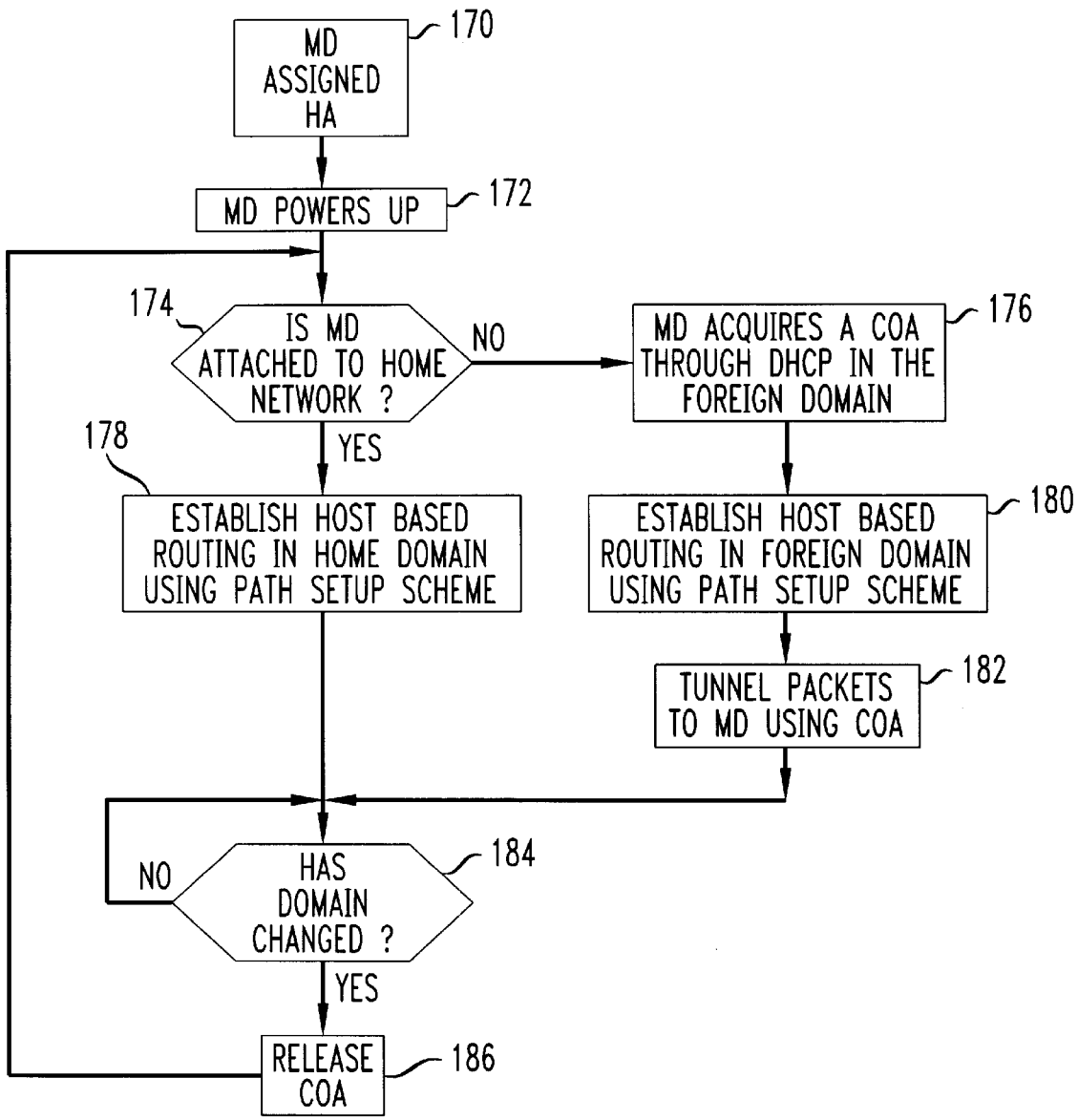
FIG. 3 is an exemplary flow diagram of the process steps performed at a Dynamic Host Configuration Protocol (DHCP) server for a domain utilizing a HAWAII domain-based architecture, the DHCP server not using a Dynamic Home Optimization.

FIG. 3 is an exemplary flow diagram of the process steps performed at a Dynamic Host Configuration Protocol (DHCP) server for a domain in order to implement the domain-based HAWAII method of the present invention, without a Dynamic Home Optimization. In step 170, a mobile device is assigned a home address for use in the home domain. The DHCP server may be implemented within the root router utilizing the capabilities of the processor and memory residing in the root router, although it would be apparent to those skilled in the art to alternatively implement the DHCP server using a separate co-located processor and memory, such as that available in a personal computer. Furthermore, the DHCP server need not be implemented in conjunction with the root router at all; that is, the DHCP server may be implemented in any local router or node capable of communicating with the other routers (including base stations) within the domain. Once the mobile device powers up, in accordance with step 172, it is determined whether the mobile device is connected through a base station included within the home domain, in accordance with step 174. If the mobile device is attached through the home domain, then in accordance with step 178, host based routing is established within the home domain utilizing a specialized path setup scheme (subsequently described).

However, if the mobile device is attached through a foreign domain (a domain other than the home domain), then in accordance with step 176, the mobile device acquires a care-of address from the DHCP server supporting the foreign domain. In accordance with step 180, host based routing in the foreign domain is then established using a specialized path setup scheme. Once a care-of address is acquired and the path setup scheme is established, packets destined for the mobile device are tunneled to the mobile device's co-located care-of address from the home domain root router, in accordance with step 182. In accordance with Step 184, as long as a mobile device is handed off to base stations included within its current domain, no action is taken (other than generating a subsequently described handoff path setup message). If however, the mobile device is handed off to a base station affiliated with a new domain, then the current care-of address is released, in accordance with step 186. The flow diagram is then reentered just prior to step 174 where a check of mobile device attachment to the home domain is performed. This procedure continues for each subsequent handoff until the mobile device powers down.

Figure 4:
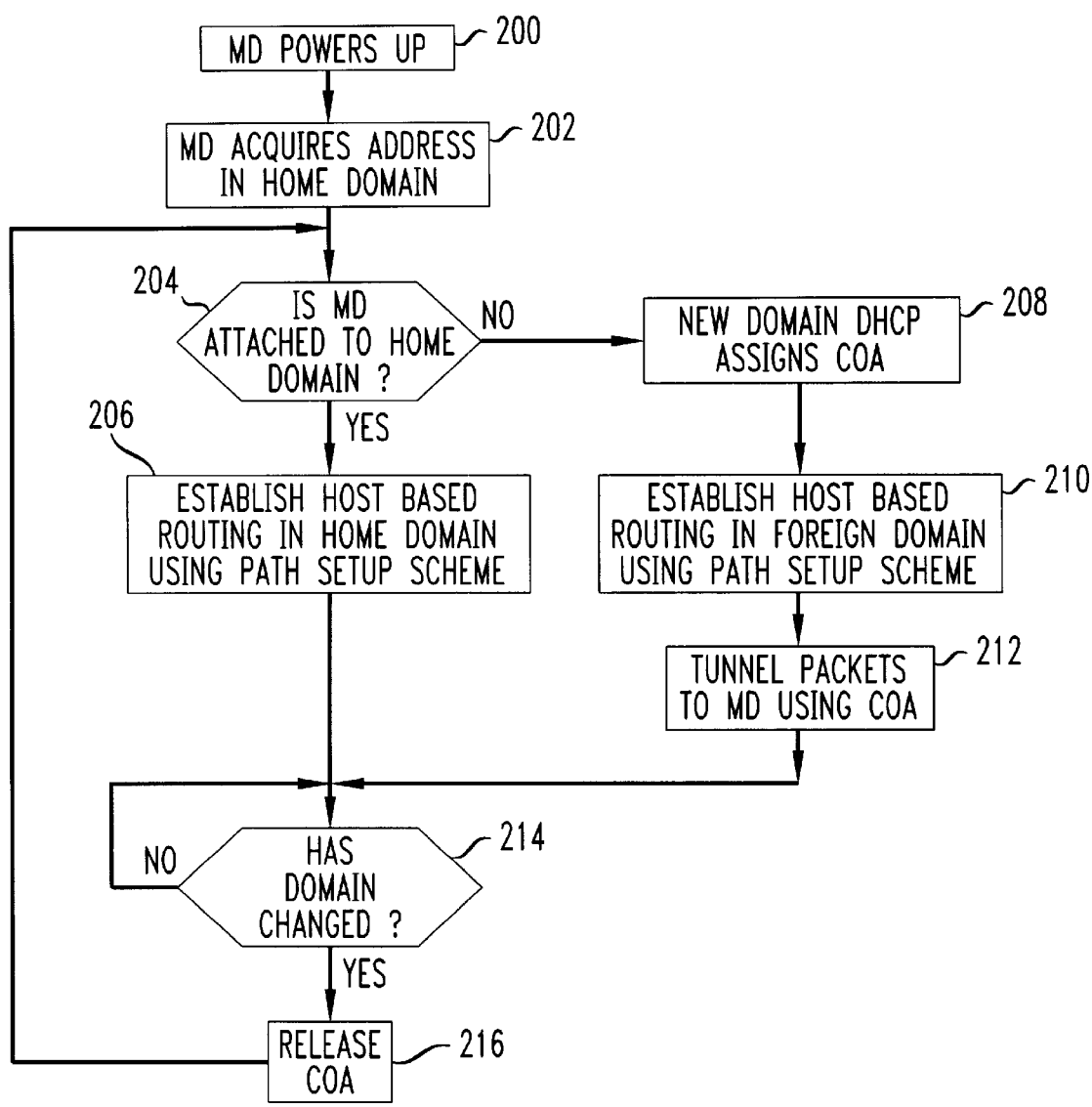
FIG. 4 is an exemplary flow diagram of the process steps performed at a Dynamic Host Configuration Protocol (DHCP) server for a domain utilizing a HAWAII domain-based architecture, the DHCP server using a Dynamic Home Optimization.

FIG. 4 is an exemplary flow diagram of the process steps performed at a Dynamic Host Configuration Protocol (DHCP) server for a domain in order to implement the domain-based HAWAII method which utilizes Dynamic Home Optimization. The procedure is similar to that described in conjunction with FIG. 3 except that the mobile device is not assigned a permanent home address. Rather, the concept of a dynamic permanent home address is introduced, as previously described. In accordance with step 200, the mobile device first powers up and establishes a link with the servicing base station prior to obtaining an address within the domain. After establishing the link, the domain's DHCP server assigns a dynamic permanent home address to the mobile device, in accordance with step 202. Using Dynamic Home Optimization, the domain in which the mobile device powers up becomes the mobile devices home domain. A determination is then made, in accordance with step 204, whether the mobile device is connected through a base station included within the home domain. Since the mobile device is always attached to a base station included within the home domain following initial power up when using Dynamic Home Optimization, then in accordance with step 206, host based routing is established within the home domain utilizing a specialized path setup scheme. In accordance with step 214, as long as a mobile device handed off to base stations included within the home domain, no action is taken (other than generating a subsequently described handoff path setup message). If however, the mobile device is handed off to a base station affiliated with a foreign domain, then the flow diagram is reentered just prior to step 204 where a check of mobile device attachment to the home domain is performed. The care-of address referred to in step 216 is not released since the mobile device has not yet been assigned one.

In accordance with step 204, if the mobile device is attached to a foreign domain, then in accordance with step 208, the mobile device acquires a care-of address from the DHCP server supporting the foreign domain. In accordance with step 210, host based routing in the foreign domain is then established using a specialized path setup scheme. Once a care-of address is acquired and the path setup scheme is established, packets destined for the mobile device are tunneled to the mobile device's co-located care-of address from the home domain root router, in accordance with step 212. In accordance with Step 214, as long as a mobile device is handed off to base stations included within its current domain, no action is taken (other than generating a subsequently described handoff path setup message). If however, the mobile device is handed off to a base station affiliated with a new domain, then the current care-of address is released, in accordance with step 216. The flow diagram is then reentered just prior to step 204 where a check of mobile device attachment to the home domain is performed. This procedure continues for each subsequent handoff until the mobile device powers down.

Figure 5:
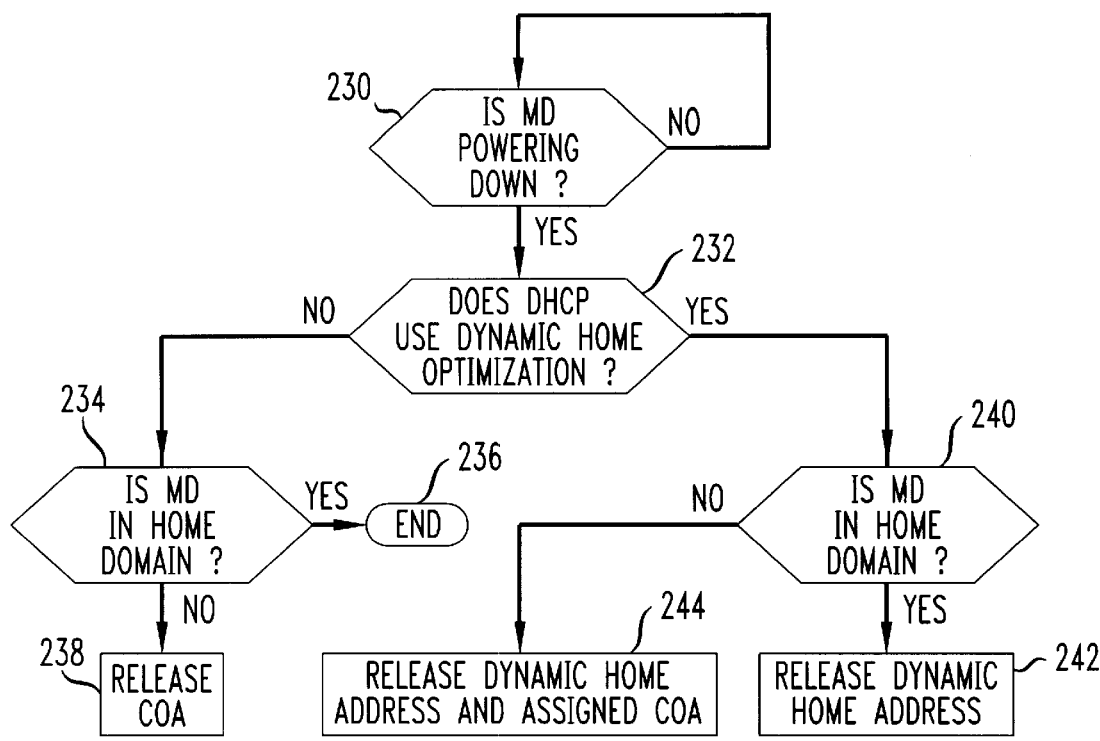
FIG. 5 is an exemplary flow diagram of the domain-based process steps performed during a mobile device power down, whether or not utilizing a Dynamic Home Optimization, and in accordance with the present invention.

FIG. 5 is an exemplary flow diagram of the domain-based process steps performed during a mobile device power down, whether or not utilizing the Dynamic Home Optimization, and in accordance with the present invention. The mobile device maintains a link via its current base station, in accordance with step 230. In accordance with step 232, if the Dynamic Host Configuration Protocol (DHCP) servers utilize Dynamic Home Optimization, then a determination is made as to whether the mobile device is attached to the Internet via its home domain, in accordance with step 240. If the mobile device, at time of power down, is attached to the Internet via a base station within a foreign domain, then in accordance with step 244, the dynamic permanent home address and the assigned care-of address are returned to their respective DHCP servers for subsequent use and assignment. If however, the mobile device, at time of power down, is attached to the Internet via a base station within the home domain, then, in accordance with step 242, only the dynamic permanent home address is returned to its respective DHCP server for subsequent use and assignment since the mobile device is not assigned a care-of address while in its home domain.

If however, the Dynamic Host Configuration Protocol (DHCP) servers do not utilize Dynamic Home Optimization, then a determination is made as to whether the mobile device is attached to the Internet via its home domain, in accordance with step 234. If the mobile device, at time of power down, is attached to the Internet via a base station within a foreign domain, then in accordance with step 238, the assigned care-of address is returned to its respective DHCP server for subsequent use and assignment. If however, the mobile device, at time of power down, is attached to the Internet via a base station within the home domain, then, in accordance with step 236, no action is taken. This is because when not using the Dynamic Home Optimization option, the permanent home address is not returned to its respective DHCP server since the home address is not dynamically assigned, but rather permanently registered with the mobile device at the home DHCP server.

Figure 6:
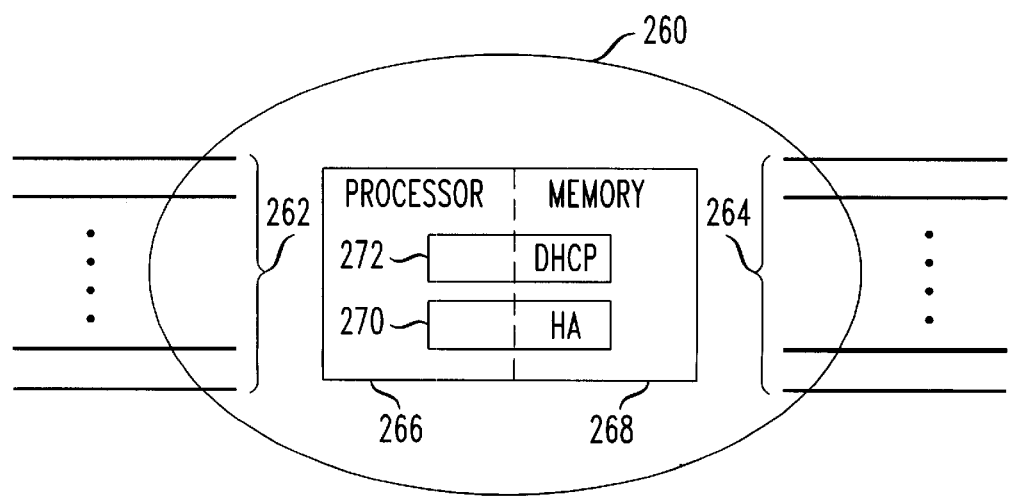
FIG. 6 is a block diagram illustrating an exemplary embodiment of a domain router hosting a Dynamic Host Configuration Protocol (DHCP) server and a home agent, in accordance with the present invention.

FIG. 6 is an exemplary embodiment of a domain router 260 hosting a Dynamic Host Configuration Protocol (DHCP) server 272 and a home agent 270. Domain routers are comprised of a plurality of ingress ports (or interfaces) 262 for receiving packets from the previous node and a plurality of egress ports (or interfaces) 264 for sending packets to a next hop. It is also known to those skilled in the art that interfaces may be bidirectional as well. That is, an interface may act as both an ingress and egress interface. Additionally, routers each include a processor 266 and memory 268. The processing and memory resources resident at each router enable the provisioning of router functions and services such as: implementing forwarding algorithms, queuing, signaling, messaging, implementing router forwarding tables, as well as other standard and supplemental router functions and services. The domain router 260 illustrated in FIG. 6 shows a DHCP server 272 and home agent 270 implemented utilizing the resources of the processor 266 and memory 268. Typically, the domain router 260 in which the DHCP server 272 and home agent 270 are implemented is the domain root router, but this arrangement is not required by necessity, as previously described. It would be apparent to those skilled in the art to alternatively implement the home agent and DHCP server in any local router or node capable of communicating with the other routers (including base stations) within a domain. Furthermore, those skilled in the art would also realize that the home agent and DHCP server may be implemented outside of the router itself using a separate co-located processor and memory, such as that available in a personal computer, with appropriate communications provided with the domain root router. Implementation of a foreign agent within a router, when required, is also performed in like manner.

It is noted that the host based routing architecture of the present invention effectively provides for system scalability. For example, the number of routing entries included within domain routing tables is dependent upon the number of mobile users active within the domain. Typically, each wireless base station may be limited to a hundred or so powered up users, due to the limited wireless bandwidth spectrum available. Since current routers support on the order of ten thousand router entries, domain size is designed to include approximately one hundred base stations. Since the coverage area of one hundred base stations is quite large (a radius of 20 km$^2$ to 500 km$^2$ depending whether located in a metropolitan or rural location), the majority of user movement is within a single domain, resulting in substantially transparent mobility with respect to home agents and correspondent nodes. Therefore, scalability is ensured: (i) through the inherent capabilities of current routers to process on the order of ten thousand routing entries, and (ii) utilizing an appropriate domain size so as to limit the maximum number of routing entries needed to be maintained by routers within each domain. In contrast, non-domain Internet backbone routers need only maintain subnet (domain) based routing entries.

Path Setup Schemes

As previously introduced, the host based domain oriented HAWAII method utilizes three basic types of path setup messages to establish, provide, and update domain routers for packet delivery management to a mobile user. The first type is a power up path setup message, initiated and sent by a mobile device during mobile device power up to first establish a router packet delivery path within the domain. The power up path setup message performs this function by establishing routing table entries, at the time the mobile device initially powers up, in the routers (including the base station to which the mobile device is attached). Only those routers which are utilized to route packets from the root router to the mobile device require routing table entries for the mobile device which is powering up, and therefore, only those routers are selected for forwarding of the power up path setup message.

The second type of path setup message is initiated and sent by a mobile device during mobile device handoff to another base station included within the domain to which the mobile device is attached. This handoff path setup message is used to update routing table entries for selected routers within the domain to reflect the mobile device handoff from one base station to another base station and ensure seamless packet delivery when such a handoff occurs. Only those domain routers having a routing table requiring updated routing table entries as a result of the handoff are selected for receiving the handoff path setup message. The handoff and power up path setup messages may be classified together as update messages.

The third type of path setup message, the refresh message is initiated and sent by a base station (for each mobile device attached through that base station) to the root router and intermediate routers to refresh soft-state routing table entries. The message may be sent individually for each mobile device, or in the alternative, the message may be an aggregation of refresh path setup messages for a plurality of mobile devices attached through the conveying base station. The refresh path setup message is used to refresh routing table entries for those selected routers within the domain which are utilized for packet transport from the root router to the base station initiating the message.

A refresh path setup message is utilized in conjunction with an embodiment of the present invention utilizing "soft-states" at routers. A soft-state router is a router which must receive a refresh path setup message periodically within a specified period of time, otherwise the host based routing link is abandoned. A soft-state scheme is particularly useful in HAWAII, where a mobile device user's mobility is accompanied by path setup messages establishing new host based routing entries responsive to each handoff. By periodically refreshing the host based routing entries, response to domain routing changes (other than those necessitated by mobile device handoffs) are also accommodated. Non-handoff subnet changes may be initiated by a number of events, including but not limited to, faults due to broken links, node congestion, traffic control, etc. Refresh path setup messages therefore, unlike path setup messages initiated in response to power up or handoff, are conveyed from base station to the domain root router for each mobile device attached to a domain base station. Thus, packet rerouting due to router or link failures while utilizing soft-state routers in a HAWAII based domain is easily accommodated. Furthermore, elimination of one or more foreign agents in the packet path to a mobile device improves the reliability of data delivery to the mobile user.

Periodic refresh messages associated with a router's soft-state routing table entries also allows for an aggregation of refresh messages corresponding to each individual mobile device attached at a base station, that is, the base station may send one refresh path setup message which contains the Information Elements for each of the mobile users attached to its wireless interface. Furthermore, as is subsequently described, refresh path setup messages are sent to only a selected few routers within the domain, reducing the quantity of overhead associated with maintenance of router soft-states.

The refresh path setup message does not require an acknowledgment. Rather, loss of a refresh path setup message is tolerated by allowing the routing table entries for domain routers to expire only after several consecutive refresh path setup messages are not received. Update path setup messages (power up and refresh) are acknowledged and retransmitted if the message or acknowledgment is not received. Therefore, path setup schemes are robust and tolerant of path setup message loss.

FIGS. 7–9 are structural diagrams for the three types of path setup messages. Path setup messages include a six field Information Element 300. FIG. 7 is a structural diagram for the Information Element fields of a refresh path setup message. FIG. 8 is a structural diagram for the Information Element fields of a power up path setup message. FIG. 9 is a structural diagram for the Information Element fields of a handoff path setup message. Some general observations are first noted with regard to path setup messages prior to the description of individual fields contained within the Information Element 300. First, as previously described, a refresh path setup message may be sent individually from a base station for each mobile device connected thereto, or in the alternative, one refresh path setup message including the Information Elements for a plurality of mobile devices connected to the base station may be conveyed in aggregated form from the base station. Second, an update path setup message refers to and includes the remaining two types of setup messages; the power up path setup message and the handoff path setup message. Third, an update path setup message includes only one Information Element 300 corresponding to only one mobile device attached to the base station. Fourth, each path setup message may optionally include an authentication header to verify the authenticity of the message being conveyed.

The Information Element 300 of a path setup message includes the following fields: (i) message type field 310, (ii) sequence number field 312, (iii) mobile device IP address field 314, (iv) source IP address field 316, (v) destination IP address field 318, and (vi) metric field 320. The message type field 310 is used to inform the receiving router which type of path setup message is being received. The sequence number field 312 is used to prevent looping of packets between an old base station and a router when a mobile device is handed off. The mobile device IP address field 314 is used to inform the receiving router of the current IP address assigned for the mobile device within the domain. The source IP address field 316 and the destination IP address field 318 are used to provide the receiving router with specific IP addresses for the domain root router and base stations (the specific information included variable based upon the type of message it is included in). The metric field 320 identifies the number of hops from the base station or router processing the Information Element to the mobile device. Therefore, metric field 320 is set to zero for path setup messages initiated by the mobile device and set to one for refresh path setup messages initiated by the corresponding base station. Each base station or router processing the Information Element sequentially increments the metric (certain path setup schemes, subsequently described, decrement the metric rather than increment the metric).

Referring only to FIG. 7, there is shown is a structural diagram for the Information Element fields of a refresh path setup message. The message type field 310 indicates that the path setup message is a refresh message. The function and use of the sequence number field 312 will be described in greater detail subsequently. However, it is noted here that the sequence number field 312 contained within a refresh message is set to the current sequence number field value stored at the base station initiating the refresh path setup message, but not less than one. The mobile device IP address field 314 is set to the IP address assigned to the mobile device attached to the base station initiating the refresh path setup message. The source IP address field 316 is set to the IP address of the base station initiating the refresh path setup message. The destination IP address field 318 is set to the IP address of the domain root router. The metric field 320 is set to one by the base station initiating the refresh path setup message and sequentially incremented by each successive router receiving the message.

Referring only to FIG. 8, there is shown is a structural diagram for the Information Element fields of a power up path setup message. The message type field 310 indicates that the path setup message is an update message. The function and use of the sequence number field 312 will be described in greater detail subsequently. However, it is noted here that the sequence number field 312 contained within a power up message is set to zero. The mobile device IP address field 314 is set to the mobile device's IP address. The source IP address field 316 is set to the IP address of the current base station servicing the mobile device. The destination IP address field 318 is set to the IP address of the domain root router. The metric field 320 is set to zero by the mobile device initiating the power up path setup message and sequentially incremented by each successive router receiving the message.

Referring only to FIG. 9, there is shown is a structural diagram for the Information Element fields of a handoff path setup message. The message type field 310 indicates that the path setup message is an update message. The function and use of the sequence number field 312 will be described in greater detail subsequently. However, it is noted here that the sequence number field 312 contained within a power up message is set to one more than the current stored sequence number field value, but not less than two. The mobile device IP address field 314 is set to the mobile device's IP address. The source IP address field 316 is set to the IP address of the new base station to which the mobile device is handed off. The destination IP address field 318 is set to the IP address of the old base station from which the mobile device is handed off. The metric field 320 is set to zero by the mobile device initiating the handoff path setup message and sequentially incremented by each successive router receiving the message.

Power UP Path Setup Message

Figure 10:
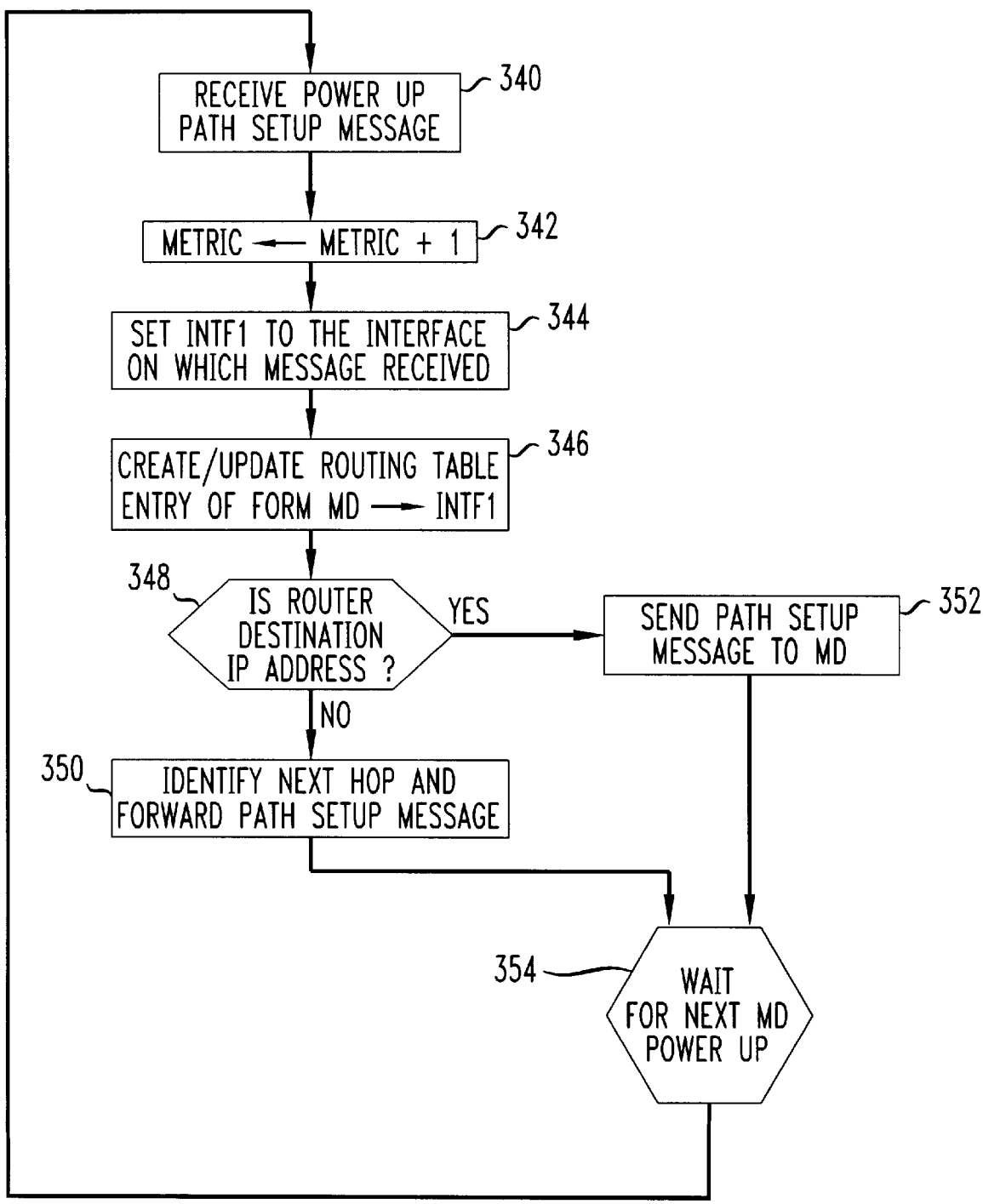
FIG. 10 is a flow diagram for an exemplary method utilized by routers in a domain-based HAWAII architecture subnet for processing a power up path setup message; in accordance with the present invention.

FIG. 10 is a flow diagram for the method utilized by domain routers processing a power up path setup message. When a mobile device initially powers up, it establishes a link with a nearby base station. During the period of link establishment, or immediately thereafter, the mobile device initiates a power up path setup message for conveyance to the domain root router, the connected base station, and each intermediate domain router which will be used for packet transport between the base station and the root router. The method illustrated and described is applicable to each router (which, as previously described, encompasses domain base stations as well, since base stations maintain or access router capabilities to interface with the wired portion of the subnet) within a host based domain implementing HAWAII, in accordance with an exemplary embodiment of the present invention. The message processing procedure described herein is performed utilizing processing and memory capacity available in current routers, as previously described. In accordance with step 340, a domain router first receives a power up path setup message. The router increments the metric in step 342. In accordance with step 344, the router then identifies the router interface over which the instant path setup message was received and sets variable Intf1 as that interface. A routing table entry is then entered, in accordance with step 346, which maps the mobile device's IP address to Intf1 (the router interface identified in step 344). In step 348, the router queries whether the router address matches the address in the destination IP address field of the instant path setup message. If yes, then the router is the domain root router and a path setup message acknowledgment is returned to the mobile device via the router/interface path just established, in accordance with step 352. If no, then the router identifies the next hop router to which it will forward the instant path setup message in order to reach the destination IP address of the instant message (the domain root router), in accordance with step 350. The router then waits for a power up path setup message initiated from another mobile device, in accordance with step 354. When a new power up path setup message is received, the router begins the message processing procedure again at step 340.

Figure 11:
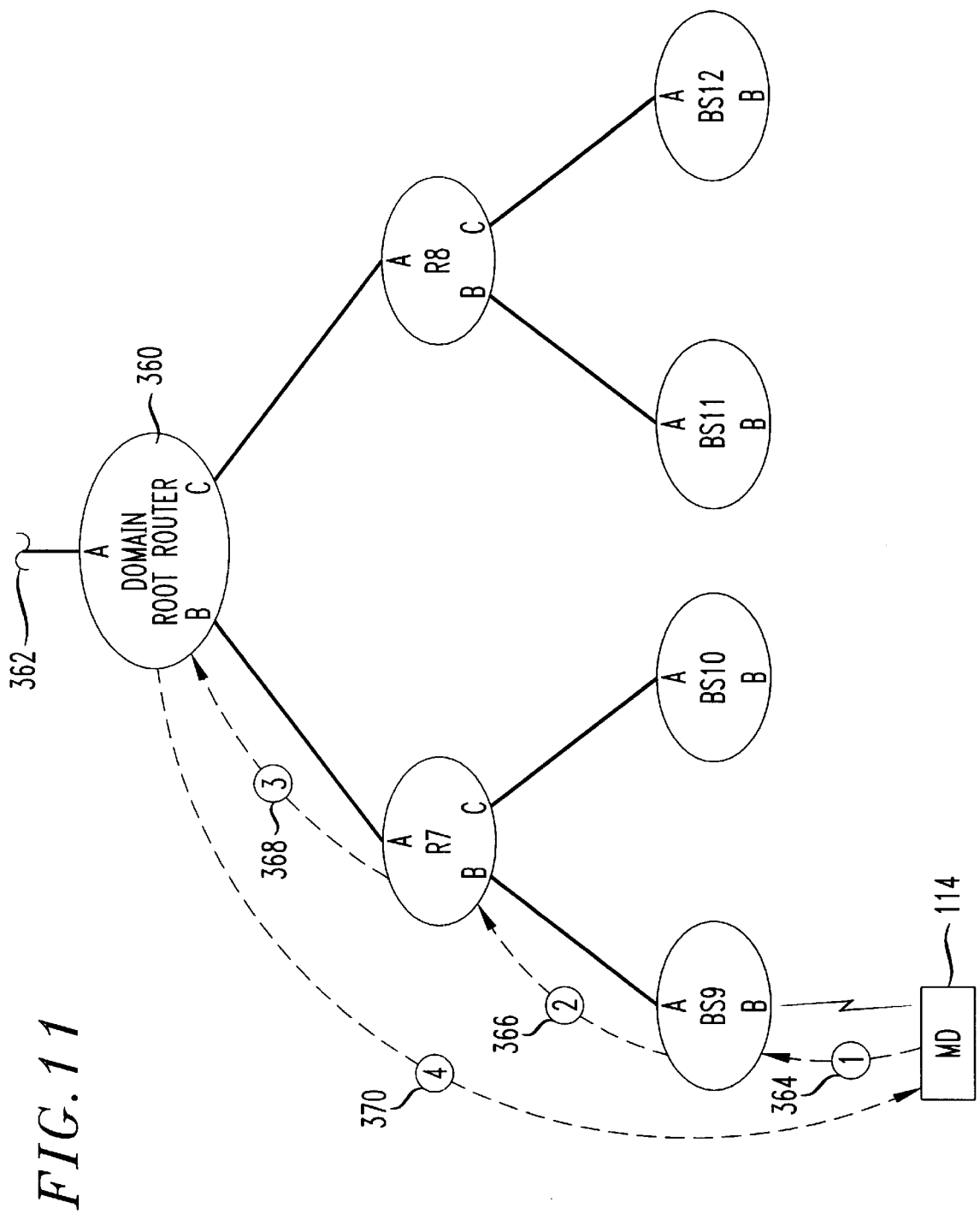
FIG. 11 illustrates a power up path setup message processing sequence in an exemplary domain utilizing HAWAII domain-based architecture, in accordance with the present invention.

FIG. 11 illustrates a power up path setup message processing sequence in an exemplary domain utilizing HAWAII host based architecture. It is noted that the use of "Intf" indicates an interface or port over which one node is coupled with a second node. Domain root router 360 accesses the Internet 362 via domain root router IntfA. The domain root router 360 IntfB is coupled to router R7 IntfA. Domain root router 360 IntfC is coupled to router R8 IntfA. Router R7 IntfB is coupled to base station BS9 IntfA. Router R7 IntfC is coupled to base station BS10 IntfA. Router R8 IntfB is coupled to base station BS11 IntfA. Router R8 IntfC is coupled to base station BS12 IntfA.

A mobile device 114 is shown attempting a power up to establish a link with base station BS9 IntfB. Upon initiating the power up, the mobile device 114 is first assigned an IP address through the Dynamic Host Configuration Protocol (DHCP) server (not shown). Assuming that the DHCP server is co-located at the root router, then base station BS9 will act as a DHCP server relay, forwarding messages between the DHCP server and the mobile device. Upon successful authentication, the DHCP server assigns an IP address to the mobile device 114 for use within the domain and additionally conveys the IP addresses of base station BS9 and the domain root router 360 to the mobile device. The mobile device creates a power up path setup message with Information Element fields set as described in conjunction with FIG. 8. The mobile device 114 then transmits the power up path setup message over a first hop 364 to base station BS9 IntfB.

Upon receiving the power up path setup message, base station BS9 increments the Information Element metric field and adds a routing entry for the mobile device 114 in its routing table. The entry for the mobile device is comprised of two fields, the mobile device IP address and an associated interface over which packets received by BS9 for delivery to the mobile device 114 are to be routed. The associated interface is set to the same interface over which the instant power up path setup message was received (BS9 IntfB, the wireless interface in this case). BS9 next performs a routing table lookup to determine a gateway to which to forward the instant power up path setup message so as to complete transport to the address indicated in the destination IP address field. In a power up path setup message, the destination IP address field is set to the domain root router address. In the instant example, BS9 determines that the appropriate gateway is router R7. Therefore, BS9 routes the instant power up path setup message for its second hop 366, from BS9 IntfA to R7 IntfB.

Upon receiving the power up path setup message, router R7 increments the Information Element metric field and adds a routing entry for the mobile device 114 in its routing table in the same manner as base station BS9 did. Therefore, router R7 associates the mobile device IP address with the interface over which the instant power up path setup message was received (R7 IntfB). Router R7 then forwards the instant power up path setup message to the domain root router 360 for the third hop 368, from R7 IntfA to IntfB of the domain root router 360. Upon receiving the power up path setup message, the domain root router 360 increments the Information Element metric field and adds a routing entry for the mobile device 114 in its routing table in the same manner as previously described. Therefore, the domain root router 360 associates the mobile device IP address with the interface over which the instant power up path setup message was received (IntfB). The domain root router 360 then routes an acknowledgment 370 back to the mobile device 114 utilizing the routing table entries just established by the power up path setup message to correlate the mobile device's IP address with an interface at each router in the path. Subsequently, packets conveyed over the Internet for delivery to the mobile device 114 are routed to the domain root router 360 based upon the subnet portion of the mobile device's IP address. Packets arriving at the domain root router 360 having the mobile device's IP address are subsequently routed to the mobile device 114 utilizing the host based routing entries created. Routers within the domain which have not received the power up path setup message, such as BS11, BS12 and R8, do not maintain routing entries corresponding to the mobile device's IP address. Therefore, these routers use a default routing path to the domain root router 360 for packets having a destination address with no corresponding entry in the routing table. Thus, a packet received at base station BS11 having a destination address corresponding to the mobile device 114 is routed to the domain root router 360 by default. Once received at the domain root router 360, the mobile device IP address is recognizable and an entry in the resident routing table is available for transport of the packet to the mobile device 114.

Refresh Path Setup Message

Figure 12:
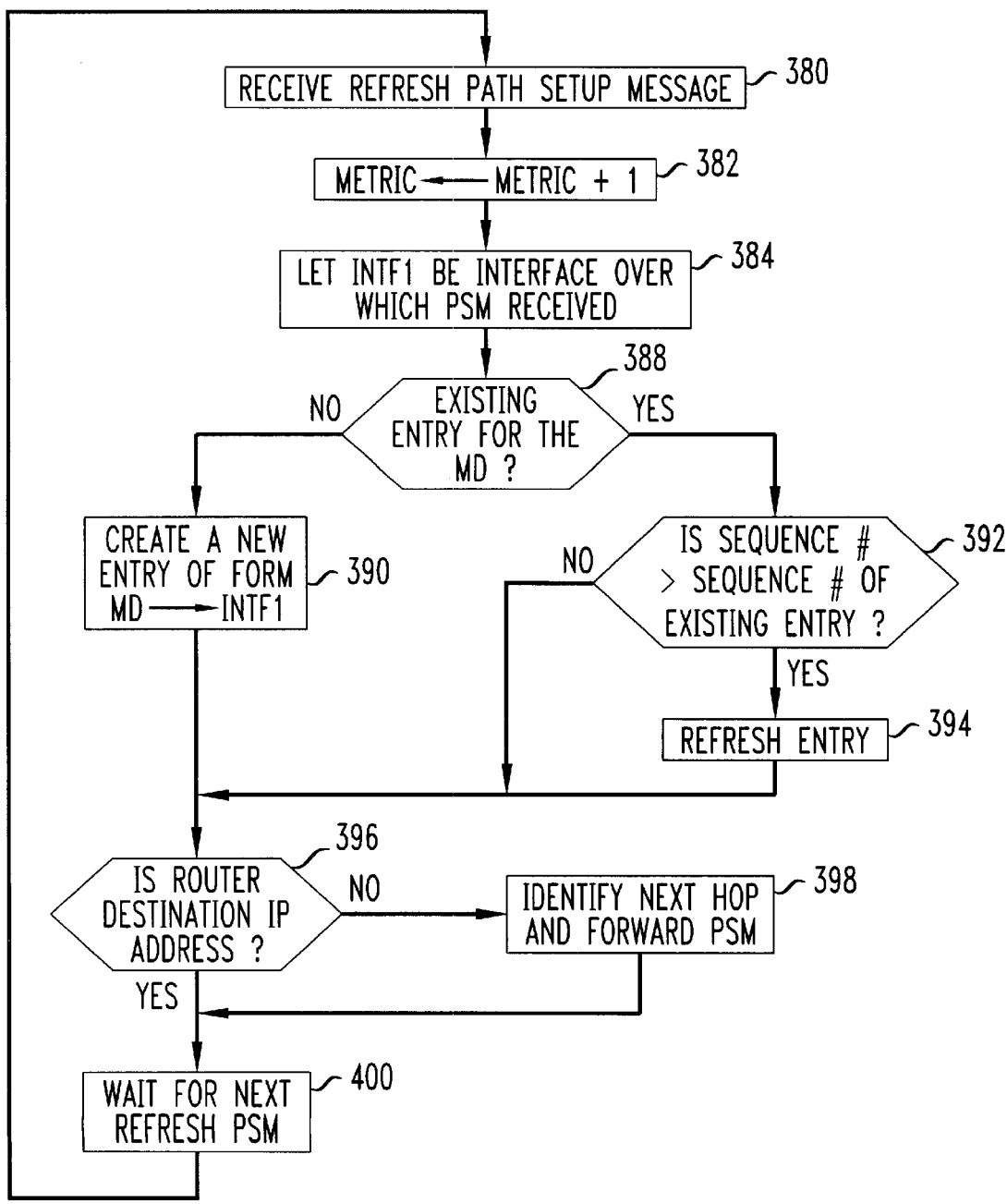
FIG. 12 is a flow diagram for an exemplary method utilized by routers in a domain-based HAWAII architecture subnet for processing a refresh path setup message, in accordance with the present invention.

FIG. 12 is a flow diagram for an exemplary method utilized by domain routers processing a refresh path setup message. As previously described, the refresh message, is initiated and sent by a base station (for each mobile device attached through that base station) to the root router and intermediate routers to refresh soft-state routing table entries. The message may be sent individually for each mobile device, or in the alternative, the message may be an aggregation of refresh path setup messages for a plurality of mobile devices attached through the conveying base station. The method herein illustrated and described is applicable to each router (which, as previously described, encompasses domain base stations as well, since base stations maintain or access router capabilities to interface with the wired portion of the subnet) within a host based domain implementing HAWAII, in accordance with an exemplary embodiment of the present invention. The message processing procedure described herein is performed utilizing processing and memory capacity available in current routers, as previously described. In accordance with step 380, a domain router first receives a refresh up path setup message. The router increments the metric in step 382. In accordance with step 384, the router then identifies the router interface over which the instant path setup message was received and sets variable Intf1 as that interface. In accordance with step 388, the router checks whether there is an existing entry in the routing table for the mobile device IP address. If not, a routing table entry is then entered, in accordance with step 390, which maps the mobile device's IP address to Intf1 (the router interface identified in step 384). If however, there is an existing routing table entry for the mobile device IP address, then in accordance with step 392, the sequence number of the instant refresh path setup message is compared to the existing router sequence number entry. If the sequence number of the instant path setup message is greater than the existing router sequence number entry, it is indicative that the instant refresh path setup message contains more current Information Element fields than those fields currently available at the router, and in accordance with step 394, Information Element fields stored at the router are updated (refreshed) to reflect the more current values as transmitted in the instant refresh path setup message.

In step 396, the router queries whether the router address matches the address in the destination IP address field of the instant refresh path setup message. If the result of the query is negative, then the router identifies the next hop router to which it will forward the instant refresh path setup message in order to reach the destination IP address of the instant message (the domain root router), in accordance with step 398. If however, the result of the query made in step 396 is affirmative, then the router is the domain root router and no further forwarding of the instant refresh path setup message is required. It is also noted that an acknowledgment of receipt by the domain root router is not required either. Then, in accordance with step 400, the router waits for the next refresh path setup message with which to update its routing table entries. Such a subsequent refresh path setup message may originate from the same base station or from another base station within the domain which utilizes the same router for forwarding packets to mobile devices which it services. Upon receiving a new refresh path setup message, the process begins anew at step 380.

Three path setup handoff schemes for use within the host based domain HAWAII architecture are subsequently described; a new-to-old path setup scheme, an old-to-new path setup scheme, and a new-to-old-to-new path setup scheme. The power up and refresh path setup messages are used in conjunction with each of the three handoff schemes presented herein. The three path setup handoff schemes differ in how the handoff path setup messages are coordinated, maintained, and forwarded. The three path setup handoff schemes described herein do not assume any existing topological knowledge. That is, path setup messages are routed within the domain utilizing routing entries created by conventional routing protocols, such as Routing Information Protocol (RIP) or Open Shortest Path First (OSPF) and without using any additional information. However, it would be apparent to those skilled in the art to apply the path setup schemes described herein within a protocol responsive to domain node, link and router congestion and/or QoS guarantee commitments.

The following description, referring to FIGS. 13–18, recites the details associated with the aforementioned three path setup handoff schemes for use within the host based domain HAWAII architecture. They are: a new-to-old path setup scheme, an old-to-new path setup scheme, and a new-to-old-to-new path setup scheme. As the respective names imply, they represent three different means of conveying messages to apprise and update domain host routers of a mobile device handoff event from an old base station to a new base station. All three schemes limit the messaging and signaling required to implement changes in the routing table entries of domain routers by updating only those selected routers for which the interface used for packet delivery has changed due to the mobile device altering its attachment within the domain to a new base station. It should be noted that the order in which base stations are notified utilizing path setup schemes (i.e.—new-to-old, oldto-new, or new-to-old-to-new) refers to the order in which individual base stations and routers process the path setup messages at a logical level. The physical path over which the path setup messages are conveyed may be different than that described at the logical level.

The term "cross-over router" is subsequently used to describe path setup handoff schemes. Referring again to FIG. 2, the term cross-over router may be defined. Consider the elements which comprise Domain1 which include the domain root router 150, routers R4 and R5, and base stations BS5, BS6, and BS7. Assume that the mobile device 114 initially powers up while attached to base station BS5. The mobile device 114 acquires (or is permanently assigned) an IP address and initiates a power up path setup message to the domain root router 150 which adds routing table entries equating a router interface with its IP address in the domain root router and each intermediate router. Therefore, a packet received by the domain root router 150 having the mobile device's IP address will be routed over the appropriate interface to router R4. Router R4 upon receiving the packet will route the packet over the appropriate interface to base station BS5. Base station BS5 will transmit the packet to the mobile device. Now assume that the mobile device 114 alters it point of attachment within Domain1 to base station BS6 and that packets destined for the mobile device 114 are to be subsequently routed via the domain root router 150, through router R4 (albeit over a new interface), and base station BS6 to the mobile device 114. It can be seen that the routing table entries for the mobile device's IP address stored at base stations BS5 and BS6 and at router R4 require updating, but that no change is required for the routing table entry at the domain root router 150. This is because the domain root router forwards packets with the mobile device's IP address to router R4 over the same interface regardless of whether ultimate delivery of the packet to the mobile device 114 is via base station BS5 or BS6. The cross-over router in this case is router R4, since it represents the first domain router in the packet delivery scheme which must alter the interface to which it forwards a packet to the mobile device when the mobile device changes its point of attachment from base station BS5 to base station BS6.

In each of the three path setup handoff schemes subsequently described, routing entries during a handoff from a first domain base station to a second domain base station are added to the existing routing table so that packets received at the old base station prior to completion of the handoff, and prior to the completion of routing table entry updates to domain routers, will be delivered to the new base station for transmission to the mobile device. Updating routing entries in this manner prevents the possibility of loop formation resulting in packet loss. Furthermore, all three path setup handoff schemes utilize the Information Element structure shown in FIG. 9 and as described in the corresponding description (with the exception that the source and destination IP address fields are interchanged when utilizing the old-to-new path setup scheme, described subsequently). However, the schemes differ in how domain routers interpret and respond to the Information Element field values.

New-to-Old Path Setup Scheme

Figure 13:
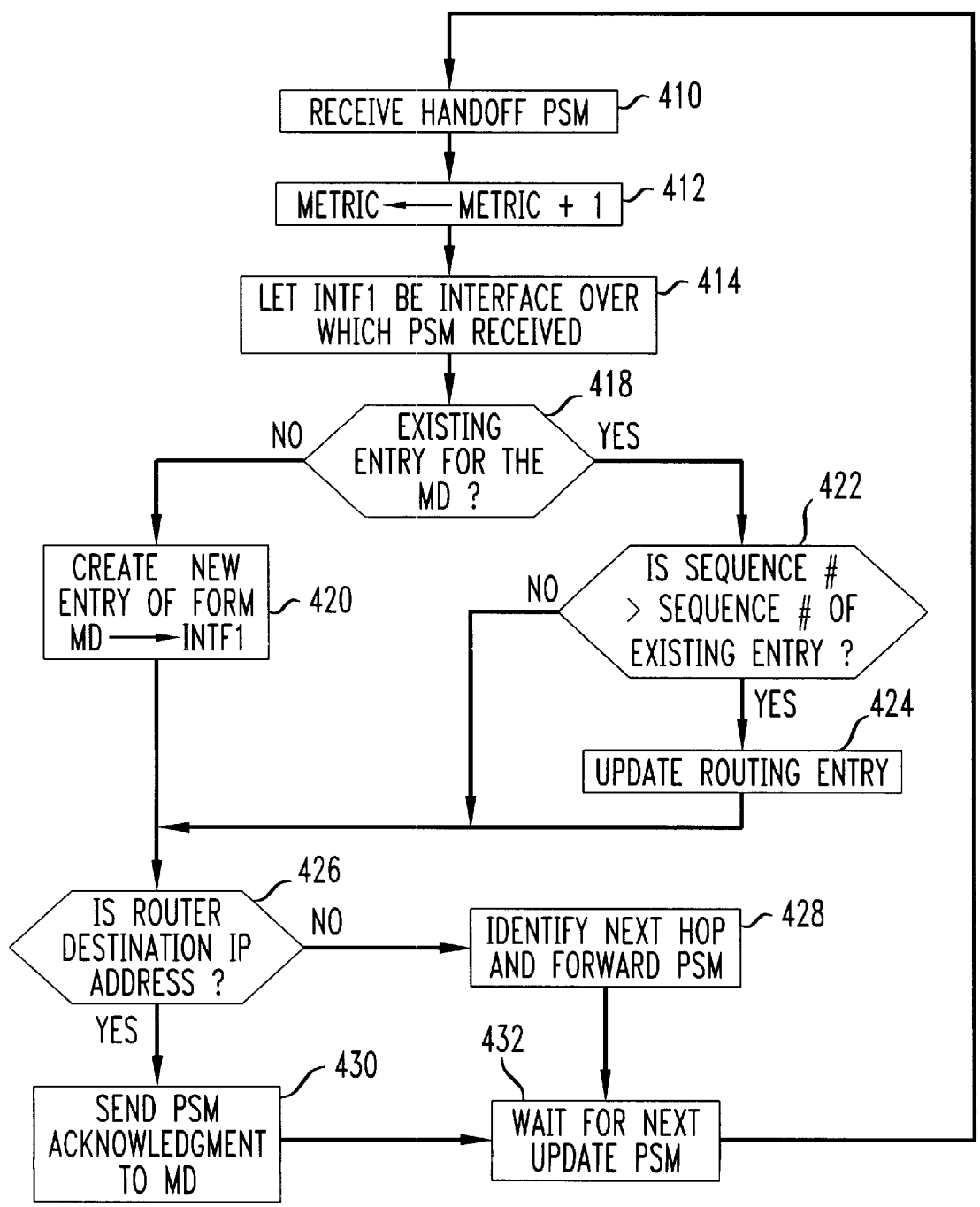
FIG. 13 is a flow diagram for an exemplary method utilized by routers in a domain-based HAWAII architecture subnet for processing a new-to-old path setup message, in accordance with the present invention.

FIG. 13 is a flow diagram for an exemplary method utilized by domain routers processing a new-to-old handoff path setup message. As previously described, a handoff path setup message is initiated and sent by a mobile device from the new base station to the old base station and selected intermediate routers up to and including the cross-over router. The base stations or routers which receive this message update their routing table entries corresponding to the originating mobile device's IP address to point to the interface of the router or base station over which the handoff path setup message arrived. Specifically, domain routers receiving a handoff path setup message include (i) each router of the post-handoff packet delivery path between the new base station and the cross-over router (including the new base station and the cross-over router) and (ii) each router of the pre-handoff packet delivery path between the cross-over router and the old base station (including the old base station). The method illustrated and described is applicable to each router (which, as previously described, encompasses domain base stations as well, since base stations maintain or access router capabilities to interface with the wired portion of the subnet) within a host based domain implementing HAWAII, in accordance with an exemplary embodiment of the present invention. The message processing procedure described herein is performed utilizing processor and memory capacity available in current routers, as previously described. In accordance with step 410, a domain router first receives a handoff path setup message. The router increments the metric in step 412. In accordance with step 414, the router then identifies the router interface over which the instant path setup message was received and sets variable Intf1 as that interface. In accordance with step 418, the router checks whether there is an existing entry in the routing table for the mobile device IP address. If not, a routing table entry is then entered, in accordance with step 420, which maps the mobile device's IP address to Intf1 (the router interface identified in step 414). If however, there is an existing routing table entry for the mobile device IP address, then in accordance with step 422, the sequence number of the instant handoff path setup message is compared to the existing router sequence number entry. If the sequence number of the instant path setup message is greater than the existing router sequence number entry, it is indicative that the instant handoff path setup message contains more current Information Element fields than those stored at the router, and in accordance with step 424 the routing table entries for the mobile device are updated.

In step 426, the router queries whether the router address matches the address in the destination address field of the instant handoff path setup message. If the result of the query is negative, then the router identifies the next hop router to which it will forward the instant handoff path setup message in order to reach the destination IP address of the instant message (the old base station), in accordance with step 428. If however, the result of the query made in step 426 is affirmative, then the router is the old base station and no further forwarding of the instant handoff path setup message is required. An acknowledgment of receipt is launched to the new base station, in accordance with step 430. Whether or not the router receiving the handoff path setup message is the old base station, the router waits for the next handoff path setup message, in accordance with step 432. Upon receiving a new handoff path setup message, the process begins anew at step 410.

Figure 14:
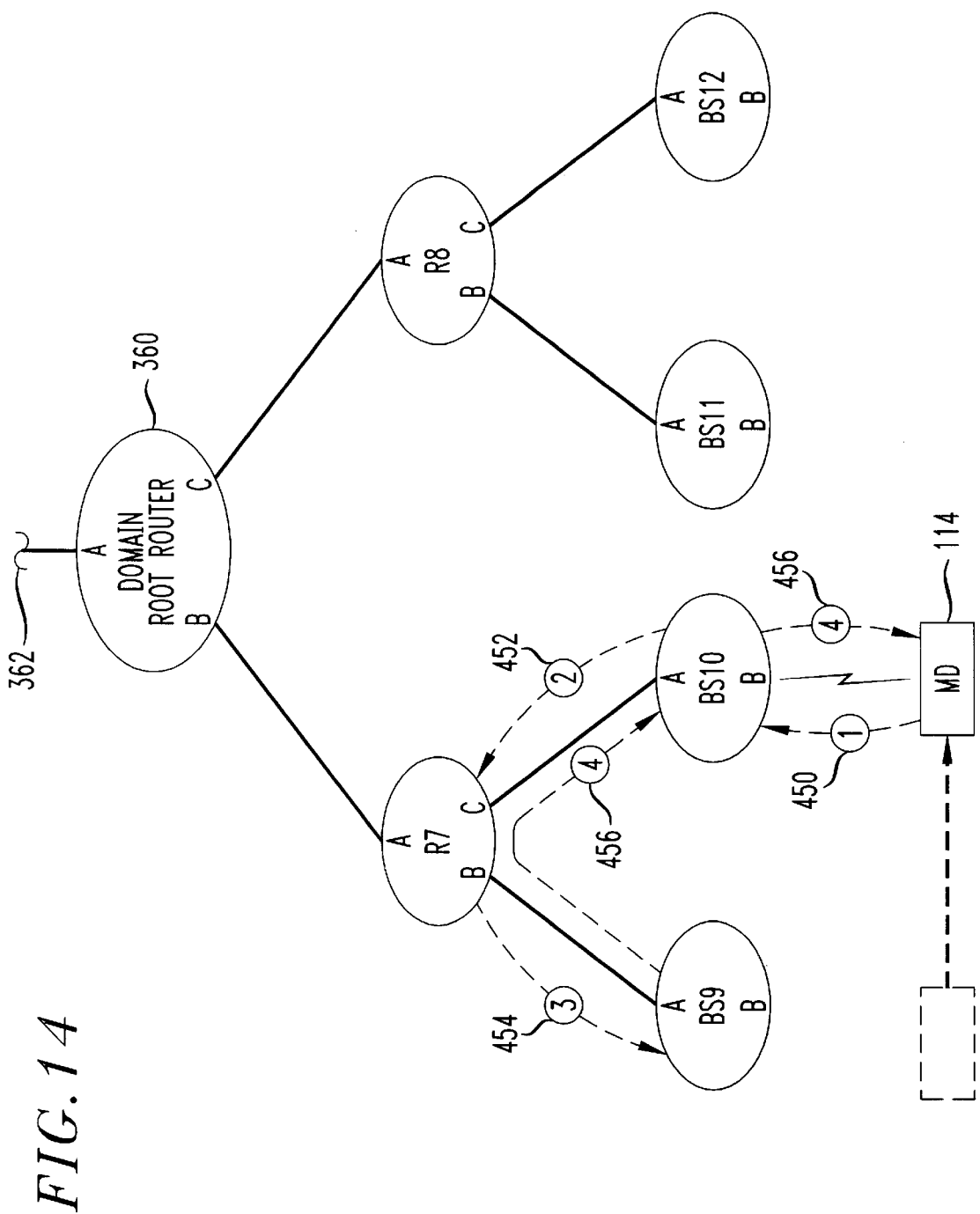
FIG. 14 illustrates an exemplary new-to-old path setup scheme processing sequence in an exemplary domain utilizing HAWAII domain-based architecture, in accordance with the present invention.

FIG. 14 illustrates a new-to-old path setup scheme processing sequence in an exemplary domain utilizing HAWAII host based architecture. It is noted that the use of "Intf" indicates an interface or port over which one node is coupled with a second node. Domain root router 360 accesses the Internet 362 via domain root router IntfA. The domain root router 360 IntfB is coupled to router R7 IntfA. Domain root router 360 IntfC is coupled to router R8 IntfA. Router R7 IntfB is coupled to base station BS9 IntfA. Router R7 IntfC is coupled to base station BS10 IntfA. Router R8 IntfB is coupled to base station BS11 IntfA. Router R8 IntfC is coupled to base station BS12 IntfA.

A mobile device 114 is shown during a handoff from old base station BS9 to new base station BS10. The mobile device 114 creates a handoff path setup message with Information Element fields set as described in conjunction with FIG. 9. The mobile device 114 then transmits the handoff path setup message over a first hop 450 to base station BS10 IntfB.

Upon receiving the handoff path setup message, base station BS10 increments the Information Element metric field and adds a routing entry for the mobile device 114 in its routing table. The entry for the mobile device is comprised of two fields, the mobile device IP address and an associated interface over which packets received by BS10 for delivery to the mobile device 114 are to be routed. The associated interface is set to the same interface over which the instant handoff path setup message was received (BS10 IntfB, the wireless interface in this case). BS10 next performs a routing table lookup for the old base station's IP address (BS9 IntfA address) to determine a forwarding router to which next send the handoff path setup message so as to complete transport to the address indicated in the destination IP address field. In the instant example, BS10 determines that the appropriate router to which to forward the handoff path setup message is router R7, which is the cross-over router. Therefore, BS10 routes the instant handoff path setup message for its second hop 452, from BS10 IntfA to R7 IntfC.

Upon receiving the handoff path setup message, router R7 increments the Information Element metric field and updates the routing entry for the mobile device 114 in its routing table in the same manner as base station BS10 did. Therefore, router R7 associates the mobile device's IP address with the interface over which the instant handoff path setup message was received (R7 IntfC). Router R7 then forwards the instant handoff path setup message to base station BS9 (the old base station) for the third hop 454, from R7 IntfB to BS9 IntfA. Upon receiving the handoff path setup message, base station BS9 increments the Information Element metric field and updates the routing entry for the mobile device 114 in its routing table in the same manner as previously described. Therefore, base station BS9 associates the mobile device IP address with the interface over which the instant handoff path setup message was received (IntfA). Thus, packets subsequently processed at base station BS9 which have the mobile device's IP address in the packet's destination address field are redirected to base station BS10 for transmission to the mobile device 114. Base station BS9 then routes an acknowledgment 456 back to the mobile device 114 utilizing the routing table entries just established by the handoff path setup message to correlate the mobile device's IP address with an interface at each router in the path. Subsequently, packets conveyed over the Internet 362 for delivery to the mobile device 114 are routed to the domain root router 360 based upon the subnet portion of the mobile device's IP address, which forwards the packets to router R7 Intf A (since the routing table entry for the mobile device's IP address at the domain root router was not altered by the handoff path setup message). Router R7 then routes packets having the mobile device's IP address to the mobile device 114 from router R7 IntfC to base station BS10 IntfA as directed by its updated routing table entry for the mobile device's IP address. Base station BS10 routes packets having the mobile device's IP address to the mobile device 114 over BS10 IntfB (BS10's wireless interface). Note that only the new and old base stations and the routers connecting them are involved in processing new-to-old handoff path setup messages. Other routers within the domain simply have a default entry pointing to the domain root router 360 and remain unchanged.

As previously introduced, including a sequence number field with the Information Element of a path setup message prevents looping of packets between an old base station and a router when a mobile device is handed off. Although described within this section pertaining to the new-to-old path setup scheme, the utilization of sequence number fields prevents looping when applied to any path setup message or scheme described herein. Recall that the host based base stations of the present invention periodically transmit a refresh path setup message to the domain root router. Still referring to FIG. 14, assume that a handoff path setup message has been created and launched from the mobile device, that the handoff path setup message has completed a second hop 452, and that router R7 has just completed processing the handoff path setup message. Also, assume that a periodic refresh path setup message has just been launched from base station BS9. Base station BS9 has not yet been notified of the mobile device 114 handoff to base station BS10 since it has not yet received the handoff path setup message. If the refresh path setup message were to be processed at router R7, its routing table entry for the mobile device would be refreshed to indicate that the mobile device is still attached at base station BS9 instead of its current point of attachment at base station BS10. The handoff path setup message would be delivered to base station BS9 after its third hop 454 and the routing table at BS9 would be updated to redirect packets destined for the mobile device 114 back to router R7. This scenario would result in packets having the mobile device IP address as a destination address being looped back and forth between base station BS9 and router R7 until the next refresh path setup message is initiated.

Packet looping is avoided, however, through the inclusion of a sequence number field within path setup messages. When a mobile device powers up, the value of the sequence number field is set to zero, indicating that the mobile device has just powered up and has not been handed off to a neighboring base station. Each time the mobile device is handed off, the mobile device increments the sequence number sent with the Information Element. Therefore, a base station initiating a refresh path setup message would send an Information Element having a sequence number field set to the pre-handoff value (i.e.—the value corresponding to the sequence number field value while still attached to that base station). The mobile device, having been handed off to a new base station, initiates a handoff path setup message having a sequence number field value incremented by one. Therefore, a refresh path setup message sent from base station BS9 and arriving at router R7 would have a sequence number field value less than the sequence number field value of the handoff path setup message initiated by the mobile device 114. Router R7, realizing that the refresh path setup message is not as current as the handoff path setup message just received, simply forwards the refresh path setup message without altering the routing table entry corresponding to the mobile device. Thus, packet looping, and the undesirable effects it causes, are avoided.

The sequence number field is set to zero during a power up to make sure that a power up path setup message is always processed. Doing so ensures packet delivery if the mobile device 114 resets itself (e.g.—as a result of a battery failure). Since a power up path setup message has a sequence number field value equal to zero to indicate its status as a power up path setup message, refresh path setup messages have a sequence number field value set to a minimum value of one. Additionally, sequence number field values associated with handoff path setup messages generated by the mobile device are incremented by one, in a wrap around manner, for each successive handoff. Therefore, handoff path setup messages have sequence number field values of between two and the maximum sequence number available for the field.

It is noted that utilization of a new-to-old path setup scheme is especially well suited for applications in which wireless devices concurrently tune to both the new and old base stations prior to and during mobile device handoff, such as a CDMA or wideband CDMA network. When used in conjunction with a TDMA network, the new-to-old path setup scheme may result in packet loss since the wireless link between the mobile device and the old base station may be torn down concurrently as the old base station receives packets destined for the mobile device. When used in conjunction with a CDMA or wideband CDMA network, the new-to-old path setup scheme allows packets to be delivered to the mobile device from either the new or old base stations.

For example, assume that a handoff from base station BS9 to base station BS10 occurs. In a TDMA network, prior to BS10 picking up the mobile device, BS9 will tear down its link with the mobile device. This is known as a hard handoff. The illustrated handoff path setup messages 450,452,454, 456 are shown in terms of logical sequence. However, assume that the path setup message is initiated over a physical wireless link through BS9 prior to tearing down the established link with the mobile device 114. Thus, once the routing table entries at BS10 and router R7 are updated, future packets destined for the mobile device 114 will be directed to base station BS10. Therefore, packets which were directed over interface R7 IntfB to BS9 prior to processing the path setup message may be dropped since the hard handoff to BS9 may occur in the interim. This is not the case with a CDMA network. Since the mobile device is able to tune and receive packets from two base stations concurrently, the mobile device will receive the packets transmitted from BS9 and BS10.

FIG. 14 illustrates the new-to-old path setup scheme processing sequence wherein cross-over router R7 is interposed between the old base station (BS9) and the new base station (BS10) over the wired portion of the subnet domain. However, what if base station BS9 and base station BS10 were wired directly to each other without an intermediate router interposed between? After processing a handoff path setup message in accordance with FIG. 14, packets destined for the mobile device 114 would be routed from the domain root router 360 through router R7, through old base station BS9, forwarded from base station BS9 to the new base station (BS10) and then to the mobile device. Assuming that the routing cost is based upon hop counts, routing packets in this manner would result in a non-optimal routing path, since packets destined for the mobile device from the domain root router 360 would be routed through the cross-over router R7 to base station BS9 and then to base station BS10 rather than directly to base station BS10 from router R7.

Figure 15:
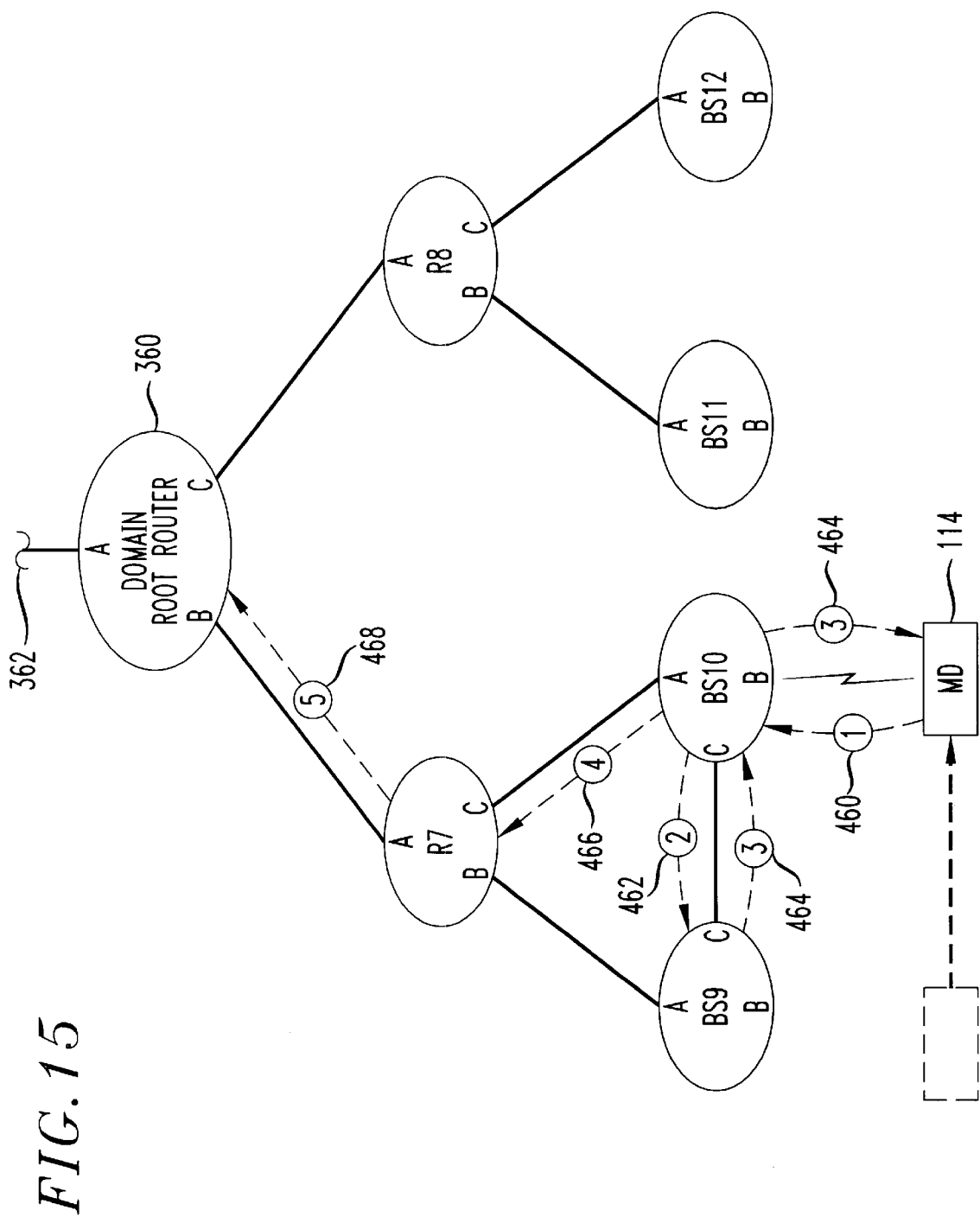
FIG. 15 illustrates an exemplary new-to-old path setup scheme processing sequence in an exemplary domain utilizing HAWAII domain-based architecture, wherein a new base station is directly couple to an old base station, in accordance with the present invention.

FIG. 15 illustrates an embodiment of the new-to-old path setup scheme processing sequence wherein the old base station is directly wired to the new base station, without the use of intermediate routers interposed between them. Therefore, in addition to the domain interconnections previously described, base station BS9 IntfC is coupled to base station BS10 IntfC. As previously described, a mobile device 114 is shown during a handoff from old base station BS9 to new base station BS10. The mobile device 114 creates a handoff path setup message with Information Element fields set as described in conjunction with FIG. 9. The mobile device 114 then transmits the handoff path setup message over the first hop 460 to base station BS10 IntfB. Base station BS10 adds or updates the routing table entry corresponding to the mobile device 114, increments the metric and then forwards the handoff path setup message over the second hop 462 from BS10 IntfC to BS9 IntfC. Base station BS9 updates the routing table entry corresponding to the mobile device 114, increments the metric, and returns an acknowledgment 464 back to the mobile device 114 utilizing the routing table entries just established by the handoff path setup message in base stations BS9 and BS10.

The non-optimal routing path problem is corrected when new base station BS10 sends its next refresh path setup message. The refresh path setup message is sent in two hops to the domain root router. The first hop 466 is to router R7 IntfC and the second hop 468 is to the domain root router 360. Although there are no needed routing changes at the domain root router, the refresh path setup message is used to refresh the routing table entry for the mobile device at router R7. After processing the refresh path setup message, router R7 associates the mobile device's IP address with the IntfC, the interface over which the refresh path setup message was received. Subsequently, all packets destined for the mobile device will be directed over router R7 IntfC to base station BS10 IntfA, thus optimizing the routing path.

Still referring to FIG. 15, consider a scenario wherein a link failure occurs for the link between base station BS10 and router R7. The next subsequent refresh path setup message launched from base station BS10 would be sent from base station BS10 IntfC to base station BS9 IntfC, from base station BS9 IntfA to router R7 IntfB, and from router R7 IntfA to the domain root router 360. This new routing path would be used because the subnet's routing protocol detects the link failure and automatically selects the alternate route as a gateway for the next best route from base station BS10 to the domain root router 360. As before, the refresh path setup message updates the routing table entry associated with the mobile device at each subsequent router receiving the message to establish the new path for packet delivery to the mobile device 114.

An interesting embodiment of the present invention is a variation of the new-to-old path setup scheme and is referred to as an "old-to-new" path setup scheme. The old-to-new path setup scheme is similar to the new-to-old path setup scheme with two major exceptions. First, a handoff path setup message is sent by the mobile device to the old base station rather than to the new base station. The old base station then routes the handoff path setup message back to the mobile device through the new base station and intermediate routers, updating the routing table entries corresponding to the mobile device at each router or base station. Second, the metric field is initially established at the old base station as one more than the metric field value associated with its routing table entry corresponding to the new base station and then decremented for each hop of the handoff path setup message back to the mobile device.

New-to-Old-to-New Path Setup Scheme

Figure 16A:
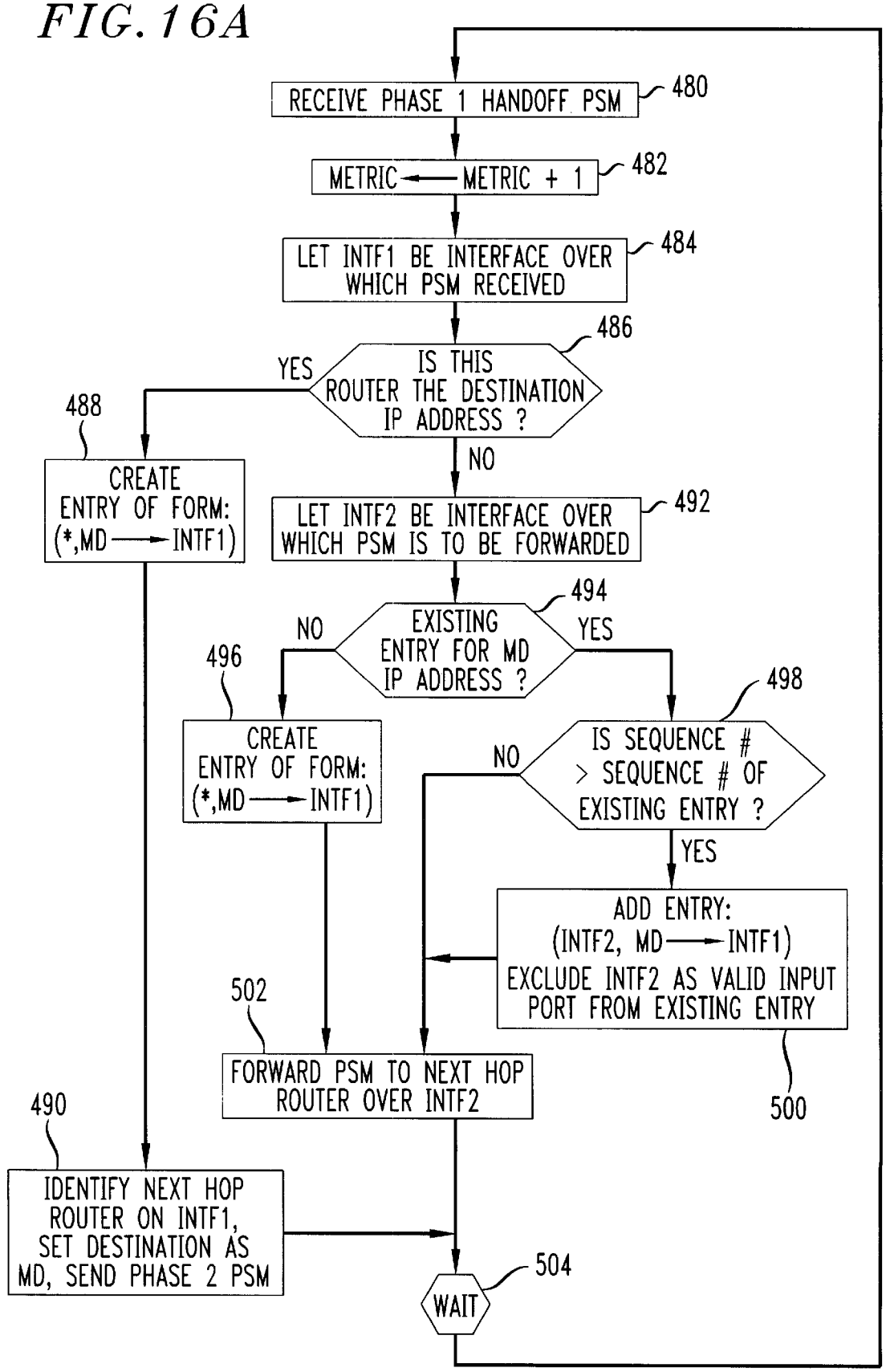
FIG. 16a is a flow diagram for an exemplary method utilized by domain routers processing a new-to-old-to-new phase one handoff path setup message, in accordance with the present invention.
Figure 16B:
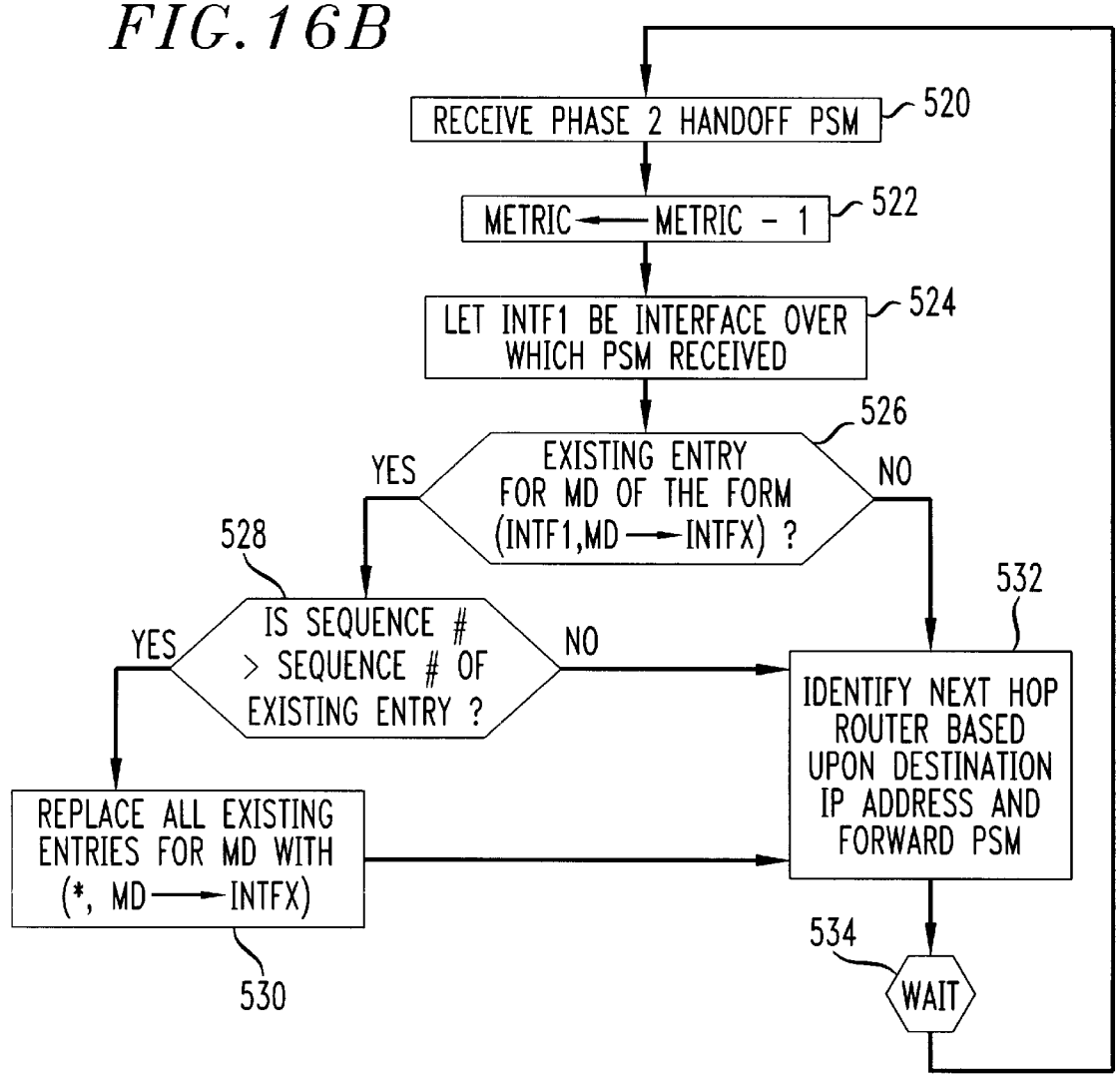
FIG. 16b is a flow diagram for an exemplary method utilized by domain routers processing a new-to-old-to-new phase two handoff path setup message, in accordance with the present invention.

FIGS. 16a and 16b are flow diagrams for an exemplary method utilized by domain routers processing a new-to-old-to-new handoff path setup message. As previously described, a handoff path setup message is initiated and sent by a mobile device to update the routing table entries for domain routers to reflect the mobile device's new point of attachment at a new base station. The new-to-old -to-new handoff path setup message first forwards the path setup message from the new base station to the old base station (in phase 1 of the path setup message which is illustrated in FIG. 16a) and then forwards the path setup message from the old base station to the new base station (in phase 2 of the path setup message which is illustrated in FIG. 16b). The method illustrated and described is applicable to each router (which, as previously described, encompasses domain base stations as well, since base stations maintain or access router capabilities to interface with the wired portion of the subnet) within a host based domain implementing HAWAII, in accordance with an exemplary embodiment of the present invention. The message processing procedure described herein is performed utilizing processor and memory capacity available in current routers, as previously described.

The new-to-old-to-new handoff path setup scheme is more complex than either the previously described new-to-old path setup scheme or the old-to-new path setup scheme. The new-to-old-to-new handoff path setup scheme utilizes a modified routing table structure. Standard routing table entries utilize two fields to determine subsequent routing paths (as previously described), associating an IP address with a router interface over which packets having that IP address as a destination address will be forwarded. The routing table structure is modified when implementing a new-to-old-to-new handoff path setup scheme to include three fields. The router interface over which an IP packet is to be forwarded is determined as a function of the router interface over which the packet was received in addition to the destination IP address. Therefore, it is possible to route a packet having the same destination IP address over different interfaces, depending upon over which router incoming interface the packet was received. The enhanced routing table entries are of the form ([Intf in,IP address]→ Intf out). However, it is noted that the format of the forwarding tables on the interface ports for the router may remain the same.

Referring now to FIG. 16a, and in accordance with step 480, a domain router first receives a new-to-old-to-new phase 1 handoff path setup message. Status as a phase 1 message indicates that the message is being processed at a router in the path from the mobile device to the old base station (i.e.—the new-to-old leg of the message path). The router increments the metric in step 482. In accordance with step 484, the router then identifies the router interface over which the instant path setup message was received and sets variable Intf1 to correspond to that interface. In accordance with step 486, the router checks whether its address is the same as the destination address in the instant path setup message. If the router is the destination address (indicating that the router is actually the old base station), then step 488 is performed.

In accordance with step 488, when a phase 1 handoff path setup message is received by the old base station, a routing table entry is created of the form ([*,MD address]→ Intf1). This notation indicates that packets arriving at the router (the old base station for the instant example) will be routed over the outgoing interface identified in step 484 (Intf1), regardless of the incoming interface over which it was received. In accordance with step 490, the next hop router attached to Intf1 is identified, the destination IP address for a phase 2 path setup message is set to that of the mobile device, and the phase 2 path setup message is launched. The router then waits, in accordance with step 504, for the next received phase 1 path setup message.

However, if the result of the check performed in accordance with step 486 indicates that the router receiving the instant message is not the router indicated in the destination IP address field of the path setup message, then step 492 is performed. In accordance with step 492, the router identifies the router interface over which the instant path setup message is to be forwarded and denotes this interface as variable Intf2. This determination is based upon the destination address field of the instant path setup message, which is the IP address of the old base station. In step 494, the router queries whether a routing table entry exists for the mobile device's IP address. If there is no routing table entry corresponding to the mobile device's IP address, then in accordance with step 496, an routing table entry for the mobile device's IP address is made. The entry is of the form ([*,MD address]→ Intf1), indicating that a packet arriving at the router having a destination IP address corresponding to that of the mobile device will be routed over Intf1, regardless of the interface over which it was received. The path setup message is then forwarded to the next hop router using Intf2, in accordance with step 502.

Returning to step 494, if it is determined that a routing table entry corresponding to the mobile device's IP address does exist, then step 498 is performed. In step 498, the sequence number of the instant handoff path setup message is compared to the existing router sequence number entry. If the sequence number of the instant path setup message less than or equal to the existing router sequence number entry, it is indicative that the instant handoff path setup message is less current than the Information Element field values stored at the router, and the instant path setup message is not processed further at the instant router. Rather, step 502 is performed, in which the instant path setup message is forwarded to the next hop router using Intf2.

If however, the sequence number of the instant path setup message is greater than the existing router sequence number entry, it is indicative that the instant handoff path setup message contains more current Information Element fields than those stored at the router, and step 500 is performed. A routing table entry is added of the form ([Intf2,MD address]→ Intf1). It is important to note that this entry is added, as opposed to replacing the existing entry. The existing entry is updated to be of the form ([~Intf2,MD address]→ IntfX). These two entries now exist concurrently in the routing table and have the following effect. A packet received at the instant router over Intf2 and having the mobile device's IP address as the destination address will be forwarded over Intf1, whereas a packet having the mobile device's IP address as the destination address and received at the instant router over any interface other than Intf2 will be forwarded over IntfX (the interface associated with the entry determined to exist in step 494). In accordance with step 502, the instant path setup message is forwarded to the next hop router using Intf2. The router then waits, in accordance with step 504, for the next received phase I path setup message.

Referring now to FIG. 16b, and in accordance with step 520, a domain router first receives a new-to-old-to-new phase 2 handoff path setup message. Status as a phase 2 message indicates that the message is being processed at a router in the path from the old base station back to the mobile device (i.e.—the old-to-new leg of the message path). The router decrements the metric, since the message is one hop closer to the mobile device with each subsequent phase 2 hop, in accordance with 522. In step 524, the router then identifies the router interface over which the instant path setup message was received and sets variable Intf1 to correspond to that interface. In step 526, the router queries whether a routing table entry exists of the form ([Intf1,MD address]→ IntfX), meaning the router processor checks whether there is an routing table entry which would forward received packets over a specified interface (IntfX) if the packets are received over Intf1 and have the mobile device's IP address as the destination address. If no such entry exists, then in accordance with step 532, forward the path setup message on a next hop as determined solely by the destination IP address included within the path setup message, and regardless of the interface over which the path setup message was received. However, if the query performed in accordance with step 526 indicates that an entry of the form ([Intf1,MD address]→ IntfX) does exist, then perform step 528.

In step 528, the sequence number of the instant handoff path setup message is compared to the existing router sequence number entry. If the sequence number of the instant path setup message less than or equal to the existing router sequence number entry, it is indicative that the instant handoff path setup message is less current than the Information Element field values stored at the instant router, and the instant path setup message is not processed further at the instant router. Rather, step 532 is performed, in which the instant path setup message is forwarded to the next hop router via IntfX.

If however, the sequence number of the instant path setup message is greater than the existing router sequence number entry, it is indicative that the instant handoff path setup message contains more current Information Element fields than those stored at the router, and step 530 is performed. The routing table entry at the instant router is updated so that all entries having the mobile device's IP address for the destination address field are modified to the form ([*,MD address]→ IntfX). That is, an entry having the mobile device's IP address is modified so that regardless of the interface over which subsequent packets are received, the packets are forwarded to the interface which existed in the entry prior to the instant modification (IntfX). In accordance with step 532, the instant path setup message is forwarded to the next hop router via IntfX. Regardless of the steps taken to arrive at and accomplish step 532, the router then waits until a next new-to-old-to-new phase 2 handoff path setup message is received. Once received, the process begins anew at step 520.

Figure 17:
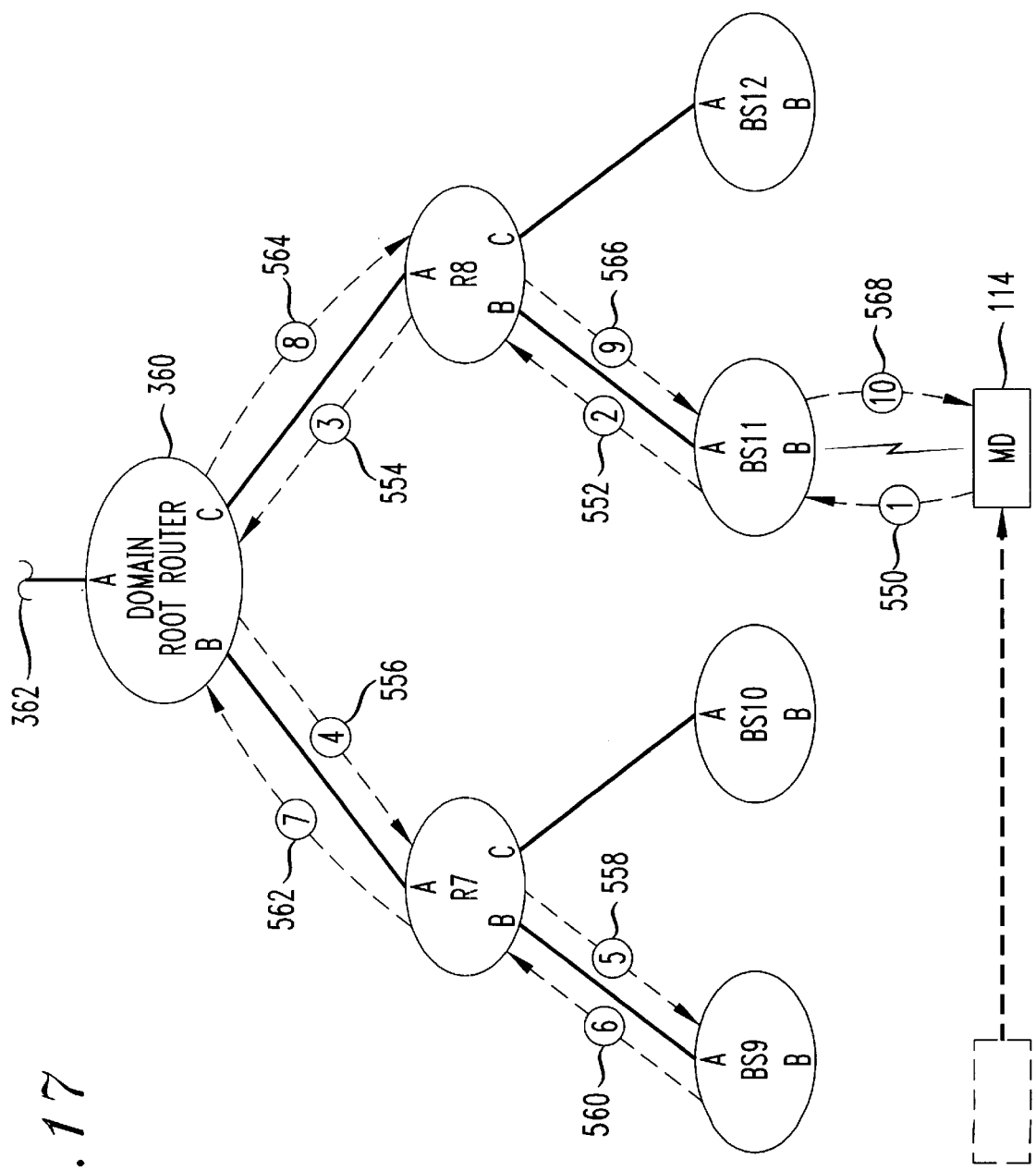
FIG. 17 illustrates an exemplary embodiment of a new-to-old-to-new path setup scheme processing sequence in an exemplary domain, in accordance with the present invention.

FIG. 17 illustrates a new-to-old-to-new path setup scheme processing sequence in an exemplary domain utilizing HAWAII host based architecture. It is noted that the use of "Intf" indicates an interface or port over which one node is coupled with a second node. Domain root router 360 accesses the Internet 362 via domain root router IntfA. The domain root router 360 IntfB is coupled to router R7 IntfA. Domain root router 360 IntfC is coupled to router R8 IntfA. Router R7 IntfB is coupled to base station BS9 IntfA. Router R7 IntfC is coupled to base station BS10 IntfA. Router R8 IntfB is coupled to base station BS11 IntfA. Router R8 IntfC is coupled to base station BS12 IntfA.

A mobile device 114 is shown during a handoff from old base station BS9 to new base station BS11. The mobile device 114 creates a new-to-old-to-new phase 1 handoff path setup message with Information Element fields set as described in conjunction with FIG. 9. The mobile device 114 then transmits the handoff path setup message over a first hop 550 to base station BS11 IntfB.

Upon receiving the instant handoff path setup message, base station BS11 increments the Information Element metric field and creates a routing table entry corresponding to the IP address of the mobile device 114. The entry for the mobile device, as previously described, is an enhanced entry comprised of three fields, the incoming interface and the mobile device IP address determining the associated outgoing interface over which packets received by base station BS11 for delivery to the mobile device 114 are to be routed. Prior to receiving and processing the instant path setup message, base station BS11 maintains a default entry as ([*,Default]→ BS11 IntfA). After processing the instant path setup message, base station BS11 creates an entry of the form ([*,MD address]→ BS11 IntfB). That is, the associated outgoing interface is set to the same interface over which the instant handoff path setup message was received (BS11 IntfB, the wireless interface in this case). BS11 next performs a routing table lookup for the old base station's IP address (BS9 address) to determine a forwarding router to which next send the handoff path setup message so as to complete transport to the address indicated in the destination IP address field. In the instant example, BS11 determines that the appropriate router to which to forward the handoff path setup message is router R8. Therefore, BS11 routes the instant handoff path setup message for its second hop 552, from BS11 IntfA to R8 IntfB.

Upon receiving the instant handoff path setup message, router R8 increments the Information Element metric field and creates a routing table entry corresponding to the mobile device 114. Prior to receiving and processing the instant path setup message, router R8 maintained a default entry as ([*,Default]→ R8 IntfA). After processing the instant path setup message, router R8 creates an entry of the form ([*,MD address]→ R8 IntfB). That is, for a packet having the mobile device's packet address as the IP header destination address, the associated outgoing interface used is the same interface over which the instant handoff path setup message was received (R8 IntfB), regardless of the incoming interface over which the packet is received. Router R8 next performs a routing table lookup for the old base station's IP address (BS9 address) to determine a forwarding router to which next send the handoff path setup message so as to complete transport to the address indicated in the destination IP address field. In the instant example, router R8 determines that the appropriate router to which to forward the handoff path setup message is the domain root router (DRR) 360. Therefore, router R8 forwards the instant handoff path setup message for its third hop 554, from router R8 IntfA to the domain root router IntfC.

Upon receiving the instant handoff path setup message, the domain root router 360 increments the Information Element metric field and adds a routing table entry corresponding to the mobile device 114. Prior to receiving and processing the instant path setup message, the domain root router 360 maintained a routing table entry for delivery of packets destined for the mobile device via base station BS9 as ([*,MD address]→ DRR IntfB), which was established by an earlier path setup message. This entry specified that regardless of the incoming interface over which a packet was received, if the packet included the mobile device's IP address as the IP header destination address, it was forwarded from the domain root router 360 via DRR IntfB. After processing the instant path setup message, the domain root router 360 modifies the existing routing table entry to be of the form ([~DRR IntfB,MD address]→ DRR IntfB) and adds an additional entry of the form ([DRR IntfB,MD address]→ DRR IntfC). Therefore, a packet having the mobile device as the destination IP address which is subsequently received at the domain root router 360 is forwarded via one of two interfaces, depending upon the interface over which the packet is received. If the packet is subsequently received over incoming interface DRR IntfB, the packet is forwarded via DRR IntfC to router R8 and eventually to the mobile device attached via base station BS11. If, however, the packet is subsequently received over any incoming interface other than DRR IntfB, then the packet is forwarded via DRR IntfB. After processing, the instant handoff path setup message is forwarded for its fourth hop 556, from the DRR IntfB to router R7 IntfA.

Upon receiving the instant handoff path setup message, router R7 increments the Information Element metric field and updates the routing table entry corresponding to the IP address of the mobile device 114. Prior to receiving and processing the instant path setup message, router R7 maintained a routing table entry for delivery of packets destined for the mobile device via base station BS9 as ([*,MD address]→ R7 IntfB), which specified that regardless of the incoming interface over which a packet was received, if the packet included the mobile device's IP address as the IP header destination address, it was forwarded from router R7 to base station BS9 via R7 IntfB. After processing the instant path setup message, router R7 modifies the existing routing table entry to be of the form ([~R7 IntfB,MD address]→ R7 IntfB) and adds an additional entry of the form ([R7 IntfB, MD address]→ R7 IntfA). Therefore, a packet having the mobile device as the destination IP address which is subsequently received at router R7 is forwarded via one of two interfaces, depending upon the interface over which the packet is received. If the packet is subsequently received over incoming interface R7 IntfB, the packet is forwarded via R7 IntfA to the domain root router 360 and eventually to the mobile device attached via base station BS11. If, however, the packet is subsequently received over any incoming interface other than R7 IntfB, then the packet is forwarded via R7 IntfB. After processing, the instant handoff path setup message is forwarded for its fifth hop 558, from router R7 IntfB to base station BS9 IntfA.

Upon receiving the instant handoff path setup message, base station BS9 increments the Information Element metric field and updates the routing table entry corresponding to the IP address of the mobile device 114. Prior to receiving and processing the instant path setup message, the old base station (BS9) maintained a routing table entry for delivery of packets destined for the mobile device as ([*,MD address]→ BS9 IntfB), which specified that regardless of the incoming interface over which a packet was received, if the packet included the mobile device's IP address as the IP header destination address, it was forwarded from base station BS9 to the mobile device via outgoing interface BS9 IntfB. After processing the instant path setup message, base station BS9 updates the routing table entry corresponding to the mobile device's address to be of the form ([*,MD address]→ BS9 IntfA). Therefore, any packet having the mobile device address for the packet header destination IP address and which is subsequently received at base station BS9 is forwarded from the old base station via BS9 IntfA, regardless of the interface over which the packet was received (thus redirecting packets over the wired portion of the domain for delivery to base station BS11 and transmission over the wireless interface at BS11 to the mobile device). Processing of the phase 1 portion of the new-to-old-to-new handoff path setup scheme is completed by altering the destination address Information Element field of the path setup message to correspond to the IP address of the mobile device. The altered message is now considered a new-to-old-to-new phase 2 handoff path setup message. The new-to-old-to-new phase 2 handoff path setup message is forwarded via a sixth hop 560, from BS9 IntfA to router R7 IntfB.

Upon receiving the instant new-to-old-to-new phase 2 handoff path setup message, router R7 decrements the Information Element metric field and updates the routing table entries corresponding to the IP address of the mobile device 114. Prior to receiving and processing the instant path setup message, two routing table entries for delivery of packets destined for the mobile device were created and maintained; a first entry of the form ([~R7 IntfB,MD address]→ R7 IntfB) and a second entry of the form ([R7 IntfB,MD address]→ R7 IntfA). After processing the instant path setup message, router R7 replaces the two existing entries corresponding to the mobile device's IP address with one entry of the form ([*,MD address]→ R7 IntfA). Therefore, router R7 subsequently forwards all packets having the mobile device's address as the IP header destination address via outgoing interface R7 IntfA, regardless of the interface over which the packets are received. After processing, the instant handoff path setup message is forwarded over its seventh hop 562, from router R7 IntfA to the domain root router 360.

Upon receiving the instant new-to-old-to-new phase 2 handoff path setup message, the domain root router 360 decrements the Information Element metric field and updates the routing table entries corresponding to the IP address of the mobile device 114. Prior to receiving and processing the instant path setup message, two routing table entries for delivery of packets destined for the mobile device were created and maintained; a first entry of the form ([~DRR IntfB,MD address]→ R7 IntfB) and a second entry of the form ([DRR IntfB,MD address]→ R7 IntfC). After processing the instant path setup message, the domain root router 360 replaces the two existing entries corresponding to the mobile device's IP address with one entry of the form ([*,MD address]→ DRR IntfC). Therefore, the domain root router 360 subsequently forwards all packets having the mobile device's address as the IP header destination address via outgoing interface DRR IntfC, regardless of the incoming interface over which the packets are received. After processing, the instant handoff path setup message is forwarded over its eighth hop 564, from the domain root router 360 interface DRR IntfC to router R8 at incoming interface R8 IntfA.

Upon receiving the instant new-to-old-to-new handoff path setup message, router R8 decrements the Information Element metric field. The routing table entry associated with the mobile device requires no updating since it is singular (the outgoing interface utilized for packet forwarding depends only upon the destination address of the IP header and is not dependent upon the incoming interface over which the packet is received) and correctly reflects the interface over which packets subsequently received, and destined for the mobile device, are to be routed. The instant handoff path setup message is next forwarded over its ninth hop 566, from router R8 IntfB to base station BS1 I IntfA.

Upon receiving the instant new-to-old-to-new handoff path setup message, the new base station (BS11) decrements the Information Element metric field. The routing table entry associated with the mobile device requires no updating since it is singular (the outgoing interface utilized for packet forwarding depends only upon the destination address of the IP header and is not dependent upon the incoming interface over which the packet is received) and correctly reflects the interface over which packets subsequently received, and destined for the mobile device, are to be routed. The instant handoff path setup message is next forwarded over its tenth hop 568, from base station BS11 IntfB to the mobile device. Receipt of the return handoff path setup message acts as an acknowledgment that the domain wired routing update procedure has been completed satisfactorily.

It is noted that utilization of a new-to-old-to-new handoff path setup scheme is especially well suited for applications wherein wireless devices tune to only one base station at a time, such as is done when utilizing TDMA equipment. Within a TDMA network, there is no concept of a soft handoff (since the mobile device does not tune to the old and new base stations concurrently). Rather, a TDMA mobile device tunes to the old base station and as it approaches a new base station it simultaneously establishes a new link with the new base station as it tears down the old link with the old base station. With the new-to-old scheme, packets may be forwarded to the old base station during the same time period in which the old link is being torn down and prior to the establishment of the new link. Therefore, use of a new-to-old scheme or an old-to-new scheme may result in packet loss. However, the new-to-old-to-new handoff path setup scheme ensures that packets forwarded to the old base station at the same time an old link is being torn down will be forwarded to the new base station. Therefore the risk of packet loss during handoff is minimized.

Figure 18:
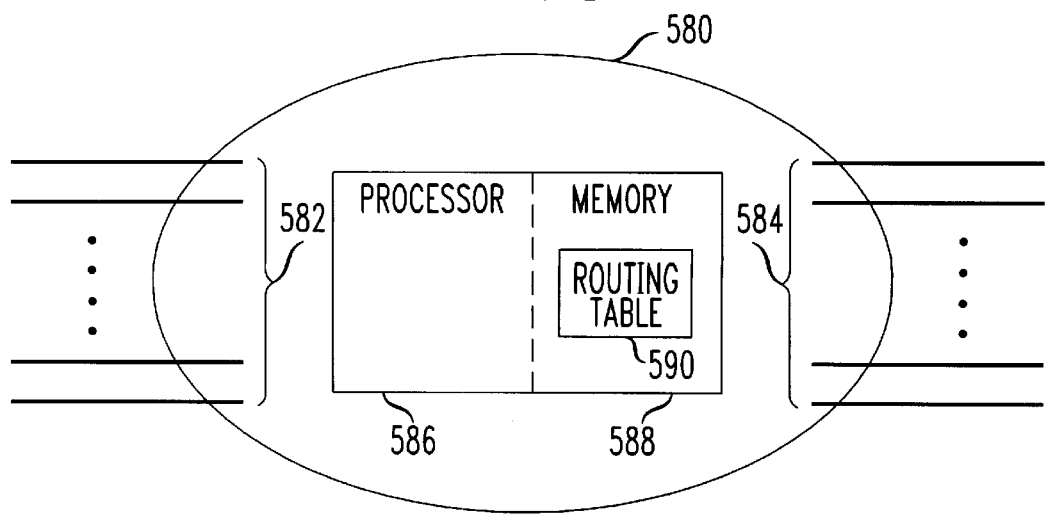
FIG. 18 is a block diagram illustrating an exemplary embodiment of a domain router having a routing table, in accordance with the present invention.

FIG. 18 is an illustration of an exemplary embodiment of a router 580 having a routing table 590 implemented in memory 588. Routers are comprised of a plurality of ingress ports (or interfaces) 582 for receiving packets from a previous node and a plurality of egress ports (or interfaces) 584 for sending packets to a next hop. It is known to those skilled in the art that interfaces may be bidirectional as well. That is, an interface may act as both an ingress and egress interface. Additionally, a router 580 includes a processor 586 and memory 588. The processing and memory resources resident at a router enable the provisioning of router functions and services such as: implementing forwarding algorithms, queuing, signaling, messaging, implementing a routing table 590, as well as other standard and supplemental router functions and services. The router 580 illustrated in FIG. 18 shows a routing table 590 implemented utilizing the resources of the router memory 588. A routing table 590 is comprised of a plurality of routing entries which are stored in a partitioned portion of the router memory 588 assigned for storage of element fields associated with the routing table 590. The router processor 586 is utilized to initially determine routing entry values and to interface with the router memory 588 for storing, updating, and accessing those values.

The aforementioned path setup schemes were implemented by modifying and extending version 2 of the Routing Information Protocol (RIPv2). The following is a description of an exemplary method utilized to model a new-to-old path setup scheme using RIPv2. The implementation of other path setup schemes is performed in a similar manner. The processing at a node proceeds as follows. A typical RIPv2 update message includes a family field identifier of AF_INET. One embodiment of the present invention utilizes HAWAII path setup messages having a family identifier of AF_MOBINET to distinguish it from routing update messages. Among the various path setup messages, refresh path setup messages are implemented utilizing a command field of RIPCMD_RESPONSE, while update path setup messages are implemented utilizing a command field of RIPCMD_RESPONSE.ACK.

When a routing daemon receives a RIP message having a family identifier of AF_MOBINET, it increments the metric field and adds an entry of the form: (IP Address of Mobile Device → Interface on which message received). If the routing daemon already possesses an entry corresponding to the mobile device, the existing entry is updated if a sequence number associated with the message is either zero or greater than the sequence number of the existing entry corresponding to the mobile device. The routing daemon then determines the interface on which the message is to be forwarded. This is performed by utilizing the routing table entry corresponding to the destination address field in the message. The message is then forwarded to a next hop router. If the address associated with the next hop router is the same as one of the interface addresses of the current router or base station, then the path setup message has reached its final destination address. When the message reaches its final destination address, an acknowledgment is generated when the command field is set as RIP_RESPONSE_ACK, as is the case for update path setup messages. The generated acknowledgment is then forwarded to the mobile device. If authentication information is maintained at domain base stations, then an acknowledgment containing the authentication information is first sent to the new base station which then forwards the acknowledgment to the mobile device.

Integration of the Routing Information Protocol (RIP) and the Mobile IP standards within a Dynamic Host Configuration Protocol (DHCP) server is accomplished in accordance with the following exemplary description. When a mobile device is powered up, it first sends a DHCP_DISCOVER message to the base station to which it attaches upon power up. The base station therefore serves as a DHCP relay and forwards the DHCP_DISCOVER message to the DHCP server. The DHCP server conveys a reply to the mobile device with a DHCP_OFFER message. The mobile device then conveys a DHCP_REQUEST message to the base station which relays the message to the DHCP server. The DHCP server then sends a DHCP_RESPONSE, which contains the mobile device's assigned address (the 'ciaddr' field), the base station's address (the 'giaddr' field), and the domain root router's address (the 'siaddr' field). The mobile device then sends an update path setup message to the current base station with a sequence number of zero and with the final destination as the domain root router. This message establishes routing entries in selected routers within the domain so that packets arriving at the domain root router are delivered to the mobile device. When the mobile device is handed off to a new base station within the same domain, it updates its sequence number as previously described and sends a path setup message using the new-to-old path setup scheme to maintain connectivity after handoff. If the mobile device is handed off to a new base station within a new domain, the mobile device acquires a care-of address via the DHCP server of the new domain. The mobile device then informs the home agent in the previous domain as to its new care-of address. Packets are then tunneled between the home agent and the new care-of address for as long as the mobile device is still attached to a base station within the new domain. When the mobile device is powered down, the address assigned from the DHCP server in the new domain and/or the address assigned from the DHCP server in the original domain are relinquished for reuse.

Authentication information may be utilized to disallow arbitrary users from sending path setup messages and thereby subverting another user's packet transmissions. The path setup messages considered within the embodiment of HAWAII described herein are deemed secure because they each require cooperation and participation by the old base station in order to implement the handoff path setup scheme. Authentication information for the user is first stored in the current base station when the mobile device powers up. When the mobile device is handed off to a new base station, the old base station approves the path setup message only if the mobile device is able to authenticate itself in the path setup message. The authentication information is then transferred from the user's old base station to the new base station on the acknowledgment of the path setup message. The assignment of an IP address during mobile device power up registration also needs to be secured to prevent arbitrary users from acquiring the IP address. This is achieved either using a mechanism such as Home Location Register (HLR) authentication, as is currently performed in cellular networks, or using the RADIUS protocol authentication mechanism.

Tunneling Optimization

Figure 19:
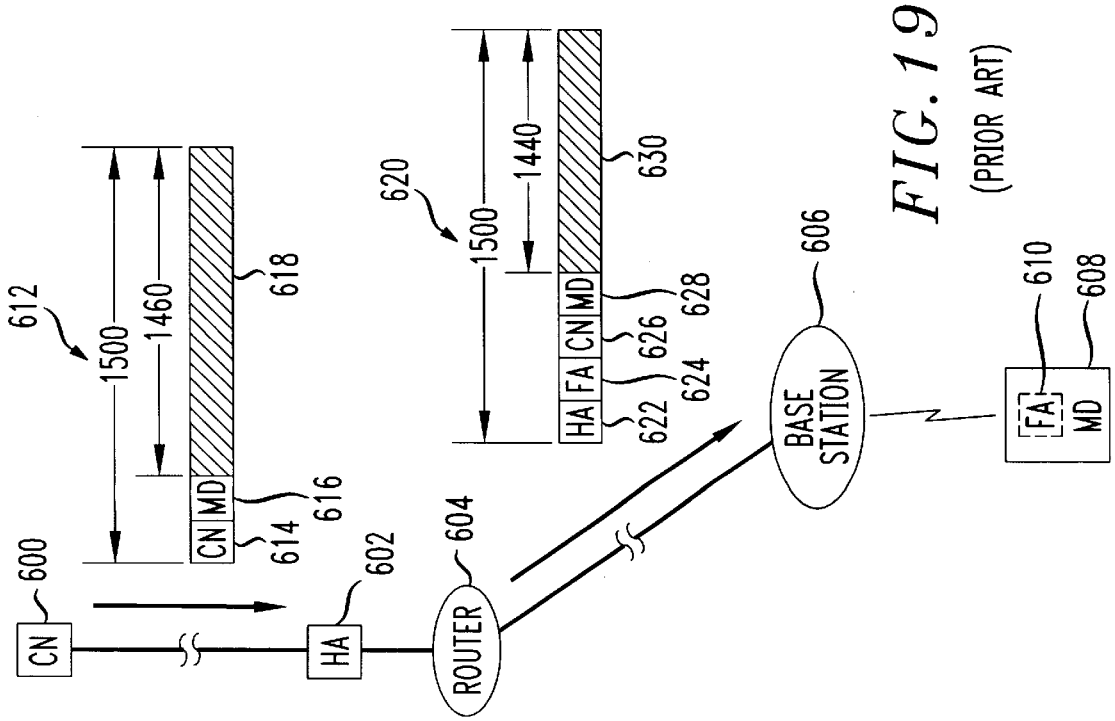
FIG. 19 is a diagram illustrating the Mobile IP standard method utilized for tunneling IP packets from a mobile device's home agent to the mobile device's foreign agent.

FIG. 19 is a diagram illustrating the Mobile IP standard method utilized for tunneling IP packets from a mobile device's home agent to the mobile device's foreign agent. Packets launched from a correspondent node 600 for delivery to a mobile device 608 are first routed to a node hosting the home agent 602 of the mobile device 608. The home agent 602 is a registered agent for the mobile device 608 to which all packets having the mobile device's IP address as a destination address are first routed. The path between the correspondent node 600 and the home agent 602 is not shown in its entirety. The Internet, private intranets, and/or a plurality of routers and nodes may be interposed between the correspondent node 600 and the home agent 602. The home an agent 602, upon receiving a packet having the mobile device's IP address as a destination address forwards the packet to the mobile device's foreign agent 610, which in the instant embodiment is shown co-located at the mobile device 608. The mobile device 610 is shown maintaining an established a wireless connection with a base station 606. A router 604 is shown interposed between the base station 606 and the home agent 602. The tunneling path between the home agent 602 and the mobile device 610 is not shown in its entirety. The Internet, private intranets, and/or a plurality of routers and nodes may be interposed between the home agent 602 and the mobile device 608.

An IP packet 612 conveyed from the correspondent node 600 for delivery to the mobile device 608 is first received at a node hosting the home agent 602. The IP packet 612 is typically limited in size, 1500 bytes in the instant embodiment. Of the 1500 bytes, 40 bytes are utilized for the IP packet header. The correspondent node is set as the IP header source address 614 and the mobile device is set as the IP header destination address 616. A total of 1460 bytes is available for data payload 618. Once received at the node hosting the home agent 602, the home agent intercepts the IP packet 612 on behalf of the mobile device 608, encapsulates the IP packet 612 with appended IP header destination and source addresses, and forwards the encapsulated packet 620 in an IP-in-IP tunnel to the foreign agent 610 co-located at the mobile device 608. The encapsulated packet is therefore comprised of the original 40 byte IP header which included the correspondent node IP address 626 and the mobile device IP address 628, a ten byte appended IP header source address 622 designated with the home agent's IP address, a ten byte appended IP header destination address 624 designated with the foreign agent's IP address, and a total of 1440 bytes available for data payload 630. When a tunneled encapsulated packet 620 is received at the foreign agent 610, the foreign agent strips the appended IP header source and destination addresses 622, 624 and delivers the remainder of the packet to the mobile device 608 for processing.

Figure 20:
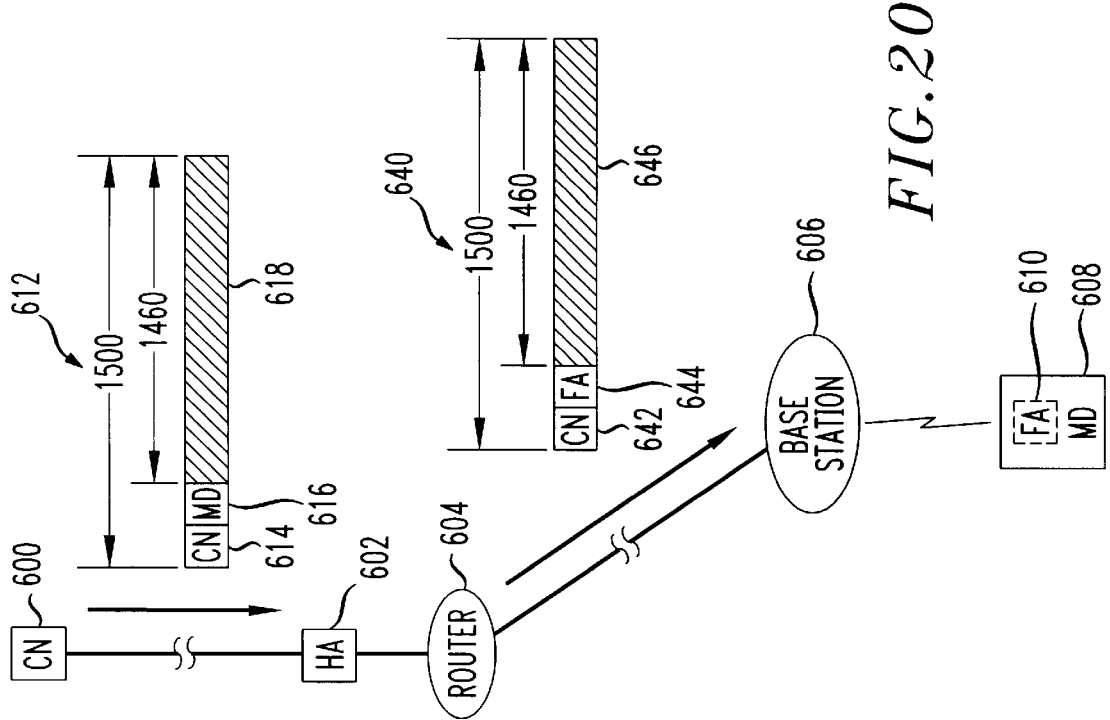
FIG. 20 is a diagram illustrating a tunneling optimization, in accordance with the present invention.

FIG. 20 is a diagram illustrating an optimization of the present invention used for tunneling IP packets from a mobile device's home agent to the mobile device's foreign agent. Packets launched from a correspondent node 600 for delivery to a mobile device 608 are first routed to a node hosting the home agent 602 of the mobile device 608. The home agent 602 is a registered agent for the mobile device 608 to which all packets having the mobile device's IP address as a destination address are first routed. The path between the correspondent node 600 and the home agent 602 is not shown in its entirety. The Internet, private intranets, and/or a plurality of routers and nodes may be interposed between the correspondent node 600 and the home agent 602. The home agent 602, upon receiving a packet having the mobile device's IP address as a destination address forwards the packet to the mobile device's foreign agent 610, which in the instant embodiment is shown co-located at the mobile device 608. The mobile device 610 is shown maintaining an established wireless connection with a base station 606. A router 604 is shown interposed between the base station 606 and the home agent 602. The tunneling path between the home agent 602 and the mobile device 610 is not shown in its entirety. The Internet, private intranets, and/or a plurality of routers and nodes may be interposed between the home agent 602 and the mobile device 608.

An IP packet 612 conveyed from the correspondent node 600 for delivery to the mobile device 608 is first received at a node hosting the home agent 602. The IP packet 612 is typically limited in size, 1500 bytes in the instant embodiment. Of the 1500 bytes, 40 bytes are utilized for the IP packet header. The correspondent node is set as the IP header source address 614 and the mobile device is set as the IP header destination address 616. A total of 1460 bytes is available for data payload 618. Once received at the node hosting the home agent 602, the home agent intercepts the IP packet 612 on behalf of the mobile device 608, and instead of encapsulating the IP packet 612 with appended IP header source and destination addresses, interchanges the address assigned to the mobile device's foreign agent 644 for the mobile device's IP address 616. Once the IP header destination address is interchanged, the new IP packet 640 is forwarded to the foreign agent 610 co-located at the mobile device 608. The new IP packet 640 is therefore comprised of a 40 byte IP header which includes the correspondent node's IP address 642, the foreign agent's IP address 644, and 1460 bytes available for data payload 646. Note that by swapping the packet's destination address instead of appending an additional IP header source and destination address, the available data payload 646 size is not adversely diminished. That is, use of tunneling optimization reduces the overhead required for tunneling a packet from the home agent to the foreign agent. When the new IP packet 640 is received at the foreign agent 610, the foreign agent interchanges the mobile device's IP address 616 for the address assigned to the mobile device's foreign agent 644 and delivers the resulting packet to the mobile device 608 for processing.

FIG. 21 is a chart of a tcpdump trace for a conventional Mobile IP tunneling of packets. As previously described, when a mobile device is away from its home network, packets are typically tunneled from the corresponding home agent to the mobile device. If correspondent nodes were to utilize a route optimization extension, packets may be routed directly to the mobile device without first being routed to a home agent. However, it will take a significant amount of time before correspondent nodes are upgraded to implement route optimization. Conventional Mobile IP tunneling of packets from the home agent to the foreign agent involves adding an additional header in each of the packets sent to the mobile device. Inclusion of this additional header presents serious and undesirable effects, as may be seen upon an examination of the tcpdump trace provided in FIG. 21. Within the tcpdump trace, it is noted that the correspondent node is indicated by CH, the mobile device is indicated by MH, the home agent is indicated by HA, and the foreign agent is indicated by FA.

The first five steps of FIG. 21 represent a Transmission Control Protocol (TCP) handshake between the correspondent node and the home agent during which it is determined that the maximum segment size (mss) is 1460 bytes. The maximum segment size reflects the size of a payload portion of an IP packet in which application data resides. The remaining 40 bytes, out of the 1500 bytes which comprise an IP packet, are utilized for the IP packet header which includes the source and destination IP addresses. In step six, when the first packet with a payload of 1460 bytes is launched with the Don't Fragment Flag set (path MTU discovery), the home agent returns an Internet Control Message Protocol (ICMP) error message back to the correspondent node to indicate that the addition of a tunneling header would require fragmentation. After completion of step seven, a new path Maximum Transmission Unit (MTU) of 1440 bytes is allocated for packet payload. Therefore, in addition to the decreased packet transmission efficiency due to the inclusion of additional packet overhead, the utilization of a tunneling header has the undesirable and inefficient effect of adding a wasted additional one round trip between the correspondent node and the home agent. This effect may be especially noticeable when utilizing the Mobile IP tunneling scheme for a web transfer from a correspondent node to a mobile device, resulting in an additional delay of 500 milliseconds or more, since each web page transfer may require a plurality of TCP downloads to complete the transfer.

FIG. 22 is a chart of a tcpdump trace for packet delivery from a home agent to a foreign agent utilizing a tunneling optimization scheme in accordance with the present invention. As previously described, the tunneling optimization utilizes a foreign agent co-located with the mobile device, therefore, a mobile device's care-of address is used as the mobile device's foreign agent address. Thus, the home agent may interchange the IP header destination address from the mobile device address to the co-located care-of address (foreign agent address). When the packet reaches the mobile device, the co-located foreign agent substitutes the mobile device's IP address for the foreign agent address, thus restoring the packet header with the originally included fields. The packet is then forwarded to the application running on the mobile device. This tunneling optimization scheme is completely transparent at the application layer and is applicable whenever the foreign agent is co-located with the mobile device. Further, the tunneling optimization incurs no additional header overhead. The first five steps of FIG. 22 represent a Transmission Control Protocol (TCP) handshake between the correspondent node and the home agent. It is noted that steps two and five are generated by the home agent even though the IP packet header source address is that of the correspondent node. As is discernible with reference to steps six through eight, an Internet Control Message Protocol (ICMP) error message requiring packet fragmentation is not needed, since no additional header is added. Therefore, use of tunneling optimization not only benefits packet transmission efficiency by reducing the packet overhead required, but also eliminates the undesirable and inefficient effect of requiring an additional one round trip per TCP session between the correspondent node and the home agent.

Figure 23:
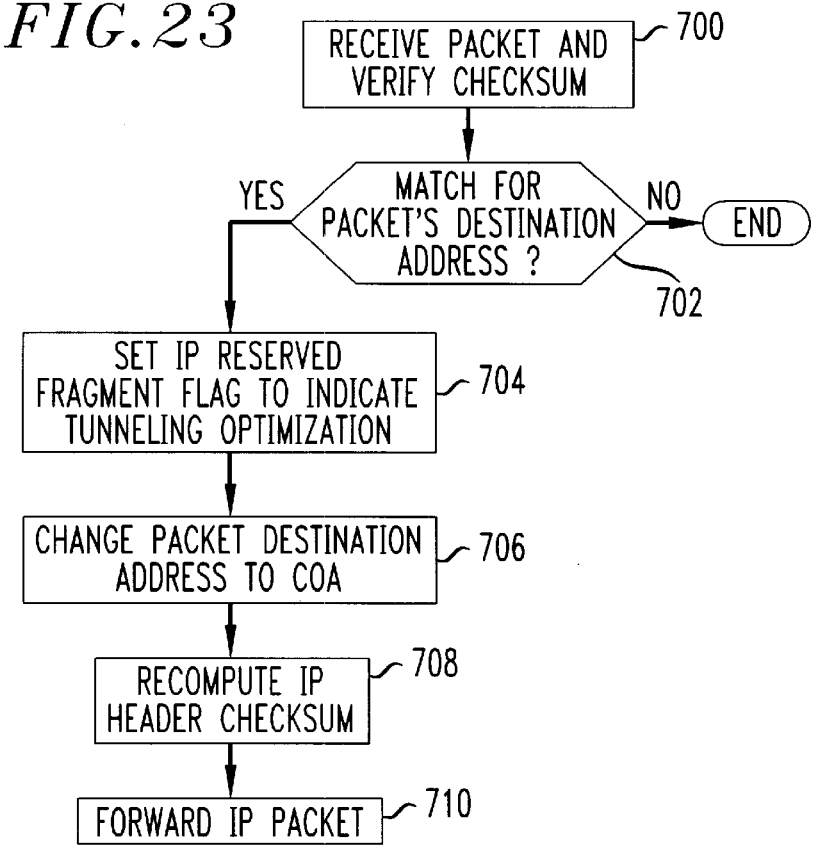
FIG. 23 is a flow diagram illustrating an exemplary procedure for implementing a tunneling optimization at a node hosting a home agent, in accordance with the present invention.

FIG. 23 is a flow diagram illustrating an exemplary procedure for implementing a tunneling optimization at a node hosting a home agent. In accordance with step 700, when a packet destined for the mobile device is received at the corresponding home agent, the IP header checksum is first checked to verify the accuracy of the IP header. The home agent maintains a list of mobile device addresses corresponding to mobile devices registered with the home agent which are away from home. This list is the Mobile Host Away From Home List. In accordance with step 702, the home agent performs a check, via a table lookup, to see whether the IP header destination address for the instant packet has an associated entry in the Mobile Host Away From Home List. If not, then the tunneling optimization process is abandoned and conventional IP processing is utilized to forward the packet. If the answer to the query of step 702 is affirmative however, then step 704 is performed. In accordance with step 704, an IP Reserved Fragment Flag is set in the packet's IP header. The IP Reserved Fragment Flag being set indicates that the associated packet is subject to the instant tunneling optimization scheme. This important information is included within the packet's IP header so that the foreign agent receiving the packet is informed that the tunneling optimization scheme has been utilized in conjunction with the packet received. In accordance with step 706, the mobile device's address contained within the instant packet's IP header destination address is replaced with the care-of address associated with the mobile device. The care-of address in this case is the foreign agent's IP address, since the foreign agent is co-located at the mobile device. In accordance with step 708, a new IP header checksum is calculated. A new checksum is calculated since the instant IP header now includes the foreign agent's IP address within the IP header destination address field, instead of the address of the mobile device. In accordance with step 710, the IP packet is then forwarded to the foreign agent which is co-located at the mobile device.

Figure 24:
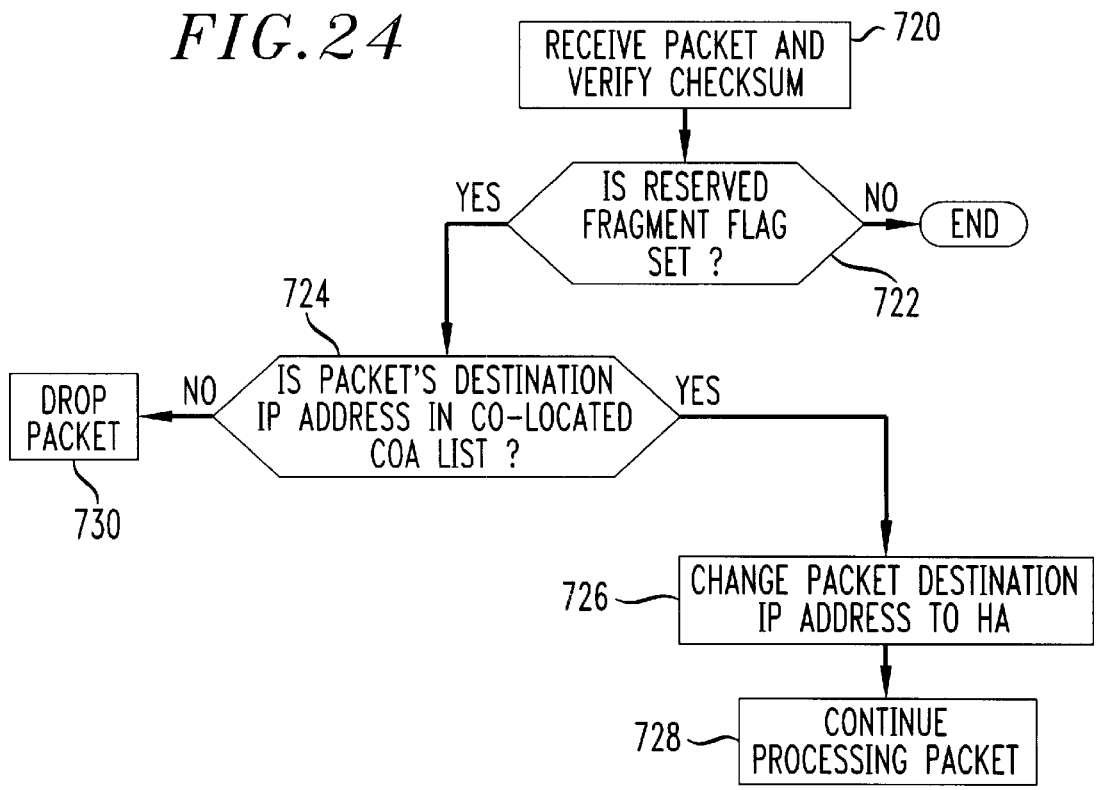
FIG. 24 is a flow diagram illustrating an exemplary procedure for implementing a tunneling optimization at a foreign agent co-located with a corresponding mobile device.

FIG. 24 is a flow diagram illustrating an exemplary procedure for implementing a tunneling optimization at a foreign agent co-located with a corresponding mobile device. In accordance with step 720, when a packet is received at the foreign agent, the IP header checksum is first checked to verify the accuracy of the IP header. In accordance with step 722, a check is made to determine whether the IP Reserved Fragment Flag, included within the IP header, is set. If the IP Reserved Fragment Flag is not set, then the instant packet has not been forwarded to the foreign agent utilizing the tunneling optimization scheme, and normal packet processing is implemented without altering the instant IP packet's destination address. If however, the Reserved Fragment Flag is set, it indicates that the tunneling optimization scheme has been implemented at the home agent and must also be implemented at the co-located foreign agent. Therefore, in accordance with step 724, the instant packet's IP header destination address is compared with entries in the foreign agent's co-located care-of address list. When the mobile device first obtains a care-of address (which is the same as the foreign agent address when the foreign agent is co-located with the corresponding mobile device), the foreign agent updates its care-of address list to reflect the current care-of address. Therefore, if the query made in step 724 returns a negative result, then the instant packet is received in error and the packet is dropped, in accordance with step 730. If however, the instant packet's IP header destination address matches an entry in the foreign agent's co-located care-of address list, then step 726 is performed. In accordance with step 726, the foreign agent substitutes, in the instant packet's IP header destination address, the IP address corresponding to the home agent for the IP address corresponding to the foreign agent (i.e.—the care-of address). In accordance with step 728, packet processing for the instant packet is then resumed at the mobile device.

The foregoing description merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various illustrated or described elements, including functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementor as more specifically understood from the context.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

What is claimed is:

1. A method of assigning a packet routing address for a wireless device accessing a wired subnet, said method comprising the steps of:

identifying an attempt by said wireless device to establish a wireless link with a base station serviced by said wired subnet;

registering a subnet packet routing address corresponding to said wireless device upon identifying said attempt;

designating said wired subnet as a home domain associated with said wireless device, said home domain being dynamically alterable according to a location of said wireless device, utilizing said subnet packet routing address for said wireless device for so long as said wireless link is maintained with any base station serviced by said wired subnet discerning a handoff of said wireless device to a base station serviced by a second wired subnet, said second wired subnet being a foreign domain;

registering a second subnet packet routing address for said wireless device; and utilizing said second subnet packet routing address as a care-of address for said wireless device for so long as said wireless link is maintained with any base station serviced by said second wired subnet.

2. The method in accordance with claim 1 wherein said step of identifying is contemporaneous with a power up of said wireless device.

3. The method in accordance with claim 2 further comprising the step of:

disassociating said subnet packet routing address from said wireless device when said wireless device powers down, thereby returning said subnet packet routing address for subsequent availability.

4. The method in accordance with claim 1 further comprising the step of:

disassociating said subnet packet routing address and said care-of address from said wireless device when said wireless device powers down, thereby returning said subnet packet routing address and said care-of address for subsequent availability.

5. An apparatus for assigning a packet routing address to a wireless device accessing a wired subnet, the apparatus comprising:

means for identifying an attempt by said wireless device to establish a wireless link with a base station serviced by said wired subnet;

means for registering a subnet packet routing address corresponding to said wireless device upon identifying said attempt, wherein said wired subnet is designated as a home domain associated with said wireless device, said home domain being dynamically alterable according to a location of said wireless device, wherein said subnet packet routing address is utilized to correspond with said wireless device for so long as said wireless link is maintained with any base station serviced by said wired subnet;

means for discerning a handoff of said wireless device to a base station serviced by a second wired subnet, said second wired subnet being a foreign domain; and means for registering a second subnet packet routing address corresponding to said wireless device, wherein said second subnet packet routing address is utilized as a care-of address for said wireless device for so long as said wireless link is maintained with any base station serviced by said second wired subnet.

6. The apparatus in accordance with claim 5 wherein said subnet packet routing address is registered with said wireless device contemporaneously with a power up of said wireless device.

7. The apparatus in accordance with claim 6 further comprising:

means for disassociating said subnet packet routing address from said wireless device when said wireless device powers down, thereby returning said subnet packet routing address for subsequent availability.

8. The apparatus in accordance with claim 5 further comprising:

means for disassociating said subnet packet routing address and said care-of address from said wireless device when said wireless device powers down, thereby returning said subnet packet routing address and said care-of address for subsequent availability.

9. In a Dynamic Host Configuration Protocol (DHCP) server, a method of assigning a packet routing address to a mobile device, said method comprising the steps of:

maintaining a plurality of available packet routing addresses in storage at said DHCP server;

assigning one of said plurality of available packet routing addresses as a mobile device address when said mobile device initiates a request for said packet routing address from said DHCP server;

designating a wired subnet as a home domain associated with said wireless device, said home domain being dynamically alterable according to a location of said wireless device, utilizing said mobile device address for packet delivery for so long as said mobile device is serviced by any wireless base station serviced by said DHCP server;

discerning a handoff of said wireless device to a base station serviced by a second wired subnet, said second wired subnet being a foreign domain;

registering a second subnet packet routing address for said wireless device; and utilizing said second subnet packet routing address as a care-of address for said wireless device for so long as said wireless link is maintained with any base station serviced by said second wired subnet.

10. The method in accordance with claim 9 wherein said request for said packet routing address is initiated when said mobile device is initially powered up.

11. The method in accordance with claim 10 further comprising the steps of:

denominating a subnet serviced by said DHCP server as a home domain for said mobile device when said mobile device is initially powered up; and utilizing said mobile device address for host based packet routing within said home domain for so long as said mobile device is serviced by any wireless base station included within said home domain.

12. The method in accordance with claim 11 further comprising the step of:

releasing said mobile device address for future assignment once said mobile device powers down.

* * * * *